(12) United States Patent
Muruganathan et al.

(10) Patent No.: US 12,114,304 B2
(45) Date of Patent: Oct. 8, 2024

(54) MEDIUM ACCESS CONTROL (MAC) CONTROL ELEMENT SIGNALING FOR MULTI-TRANSMISSION POINT/MULTI PANEL PHYSICAL DOWNLINK SHARED CHANNEL TRANSMISSION

(71) Applicant: Telefonaktiebolaget LM Ericsson (publ), Stockholm (SE)

(72) Inventors: Siva Muruganathan, Stittsville (CA); Helka-Liina Määttanen, Helsinki (FI); Mattias Frenne, Uppsala (SE); Shiwei Gao, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 450 days.

(21) Appl. No.: 17/426,022

(22) PCT Filed: Jan. 30, 2020

(86) PCT No.: PCT/IB2020/050760
§ 371 (c)(1),
(2) Date: Jul. 27, 2021

(87) PCT Pub. No.: WO2020/157703
PCT Pub. Date: Aug. 6, 2020

(65) Prior Publication Data
US 2022/0191892 A1 Jun. 16, 2022

Related U.S. Application Data

(60) Provisional application No. 62/799,898, filed on Feb. 1, 2019.

(51) Int. Cl.
*H04W 72/12* (2023.01)
*H04L 5/00* (2006.01)
(Continued)

(52) U.S. Cl.
CPC ....... *H04W 72/1263* (2013.01); *H04L 5/0051* (2013.01); *H04L 5/0098* (2013.01); *H04W 72/23* (2023.01); *H04W 80/02* (2013.01)

(58) Field of Classification Search
CPC . H04W 72/1263; H04W 72/23; H04W 80/02; H04W 12/28; H04W 72/04;
(Continued)

(56) References Cited

U.S. PATENT DOCUMENTS

2018/0128376 A1* 5/2018 Breusa ................. F16J 15/3244
2018/0206132 A1   7/2018 Guo et al.
(Continued)

FOREIGN PATENT DOCUMENTS

CN    109076378 A    12/2018
CN    109076560 A    12/2018
(Continued)

OTHER PUBLICATIONS

Enhancements on multi-TRP/panel transmission Spokane, USA. (Year: 2018).*
(Continued)

*Primary Examiner* — Mewale A Ambaye
(74) *Attorney, Agent, or Firm* — Weisberg I.P. Law, P.A.

(57) ABSTRACT

A method, wireless device and network node are disclosed. According to one embodiment, a network node is configured to transmit within a medium access control, MAC, control element, CE, message, an indication of a plurality $K_j$ of Transmission Configuration Indication, TCI, states that are mapped to a single codepoint, j, in a downlink control information, DCI, Transmission Configuration Indication, TCI, field, $K_j$ and j being integers, and transmit within the MAC CE message, the number $K_j$ of TCI states being mapped to the codepoint j. In another embodiment, a wireless device is configured to receive within a MAC CE
(Continued)

message from the network node, an indication of a plurality $K_j$ of TCI states that are mapped to a single codepoint, j, in a DCI TCI field, and receive within the MAC CE message, the number $K_j$ of TCI states mapped to the codepoint j.

18 Claims, 18 Drawing Sheets

(51) Int. Cl.
*H04W 72/1263* (2023.01)
*H04W 72/23* (2023.01)
*H04W 80/02* (2009.01)

(58) Field of Classification Search
CPC ............. H04W 72/0473; H04L 5/0051; H04L 5/0098; H04B 7/06; H04B 7/024
See application file for complete search history.

(56) References Cited

U.S. PATENT DOCUMENTS

| | | | | |
|---|---|---|---|---|
| 2022/0022141 A1* | 1/2022 | Cirik | ................... | H04W 52/325 |
| 2022/0217695 A1* | 7/2022 | Liou | ................... | H04B 7/0695 |
| 2022/0225369 A1* | 7/2022 | Park | ................... | H04W 72/23 |
| 2023/0217434 A1* | 7/2023 | Cirik | ................... | H04L 5/0094 |
| | | | | 370/329 |
| 2023/0239113 A1* | 7/2023 | Kim | ................... | H04L 5/0094 |
| | | | | 370/329 |
| 2023/0261719 A1* | 8/2023 | Liu | ................... | H04B 7/0695 |
| | | | | 375/267 |

FOREIGN PATENT DOCUMENTS

| | | | |
|---|---|---|---|
| CO | 00016929 | A1 | 5/2003 |
| WO | 2018/083253 | A1 | 5/2018 |
| WO | 2018/128376 | A1 | 7/2018 |
| WO | 2018/156696 | A1 | 8/2018 |
| WO | 2018/217063 | A1 | 11/2018 |
| WO | 2020/063806 | A1 | 4/2020 |

OTHER PUBLICATIONS

Indian Office Action dated Jun. 1, 2022 issued in corresponding Indian Patent Application No. 202147038840, consisting of 6 pages.
International Search Report and Written Opinion dated May 7, 2020 issued in PCT Application No. PCT/IB2020/050760, consisting of 15 pages.
Mediatek, Inc., R1-1812349; 3GPP TSG RAN WG1 Meeting #95; Agenda Item: 7.2.8.2; Title: Enhancements on Multi-TRP/Panel Transmission; Document for: Discussion; Spokane, USA, Nov. 12-16, 2018, consisting of 3 pages.
3GPP TS 38.321 V15.3.0 (Sep. 2018) 3rd Generation Partnership Project; Technical Specification Group Radio Access Network; NR; Medium Access Control (MAC) Protocol Specification (Release 15), consisting of 76 pages.
Written Opinion of the International Preliminary Examining Authority dated Feb. 5, 2021, issued in PCT Application No. PCT/IB2020/050760, consisting of 9 pages.
International Preliminary Report on Patentability dated Apr. 30, 2021 issued in PCT Application No. PCT/IB2020/050760, consisting of 21 pages.
3GPP TS 38.211 V15.4.0 (Dec. 2018) 3rd Generation Partnership Project; Technical Specification Group Radio Access Network; NR; Physical Channels and Modulation (Release 15), consisting of 96 pages.
3GPP TS 38.212 V15.4.0 (Dec. 2018) 3rd Generation Partnership Project; Technical Specification Group Radio Access Network; NR; Multiplexing and Channel Coding (Release 15), consisting of 100 pages.
3GPP TS 38.331 V15.4.0 (Dec. 2018) 3rd Generation Partnership Project; Technical Specification Group Radio Access Network; NR; Radio Resource Control (RRC) Protocol Specification (Release 15), consisting of 474 pages.
3GPP TS 38.214 V15.4.0 (Dec. 2018) 3rd Generation Partnership Project; Technical Specification Group Radio Access Network; NR; Physical Layer Procedures for Data (Release 15), consisting of 102 pages.
Chinese Office Action dated Nov. 18, 2023 issued in corresponding Chinese Patent Application No. 202080011981.3 consisting of 10 pages.
3GPP TSG-RAN WG2 #100, Tdoc R2-1713533, Source: Ericsson; Title: MAC CEs for activating an RS resource and handling corresponding TCI states; Agenda Item: 10.3.1.13; Document for: Discussion, Decision; Reno, USA, Nov. 27-Dec. 1, 2017, consisting of 5 pages.
3GPP TSG RAN WG1 Meeting #95, R1-1812243, Source: Huawei, HiSilicon; Title: Enhancements on multi-TRP/panel transmission; Agenda Item: 7.2.8.2; Document for: Discussion and Decision; Spokane, USA, Nov. 12-16, 2018, consisting of 9 pages.
Colombian Office Action dated Dec. 29, 2023 issued in corresponding Colombian Patent Application No. NC2021/0010863 consisting of 8 pages.

* cited by examiner

Front Loaded Type 1
1 symbol
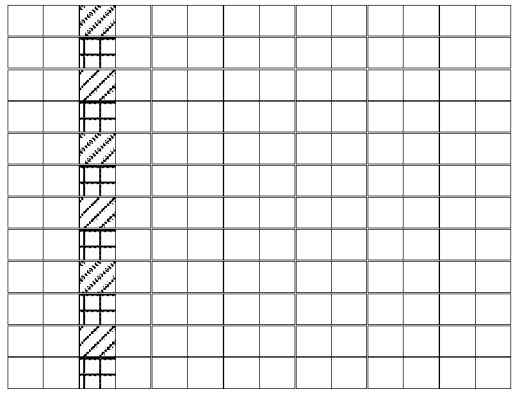
Comb 2 + 2CS
2 symbols
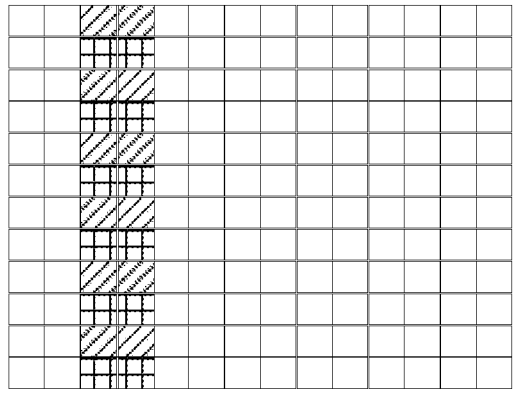
Comb 2 + 2CS T-OCC {1,1} {1,-1}
Front Loaded Type 2
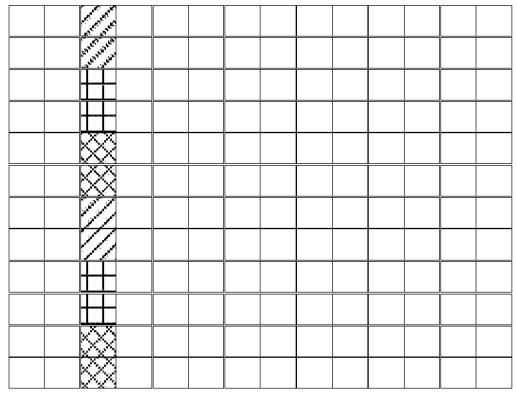
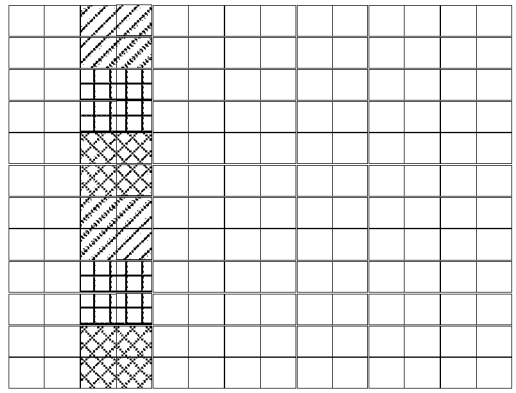
▨ CDM Group 1
⊞ CDM Group 2
▩ CDM Group 3
FIG. 3

| R | Serving Cell ID | | | | | BWP ID | | Oct 1 |
|---|---|---|---|---|---|---|---|---|
| $T_7=1$ | $T_6=0$ | $T_5=1$ | $T_4=1$ | $T_3=0$ | $T_2=1$ | $T_1=0$ | $T_0=0$ | Oct 2 |
| $T_{15}=0$ | $T_{14}=0$ | $T_{13}=1$ | $T_{12}=0$ | $T_{11}=1$ | $T_{10}=0$ | $T_9=1$ | $T_8=1$ | Oct 3 |

FIG. 5

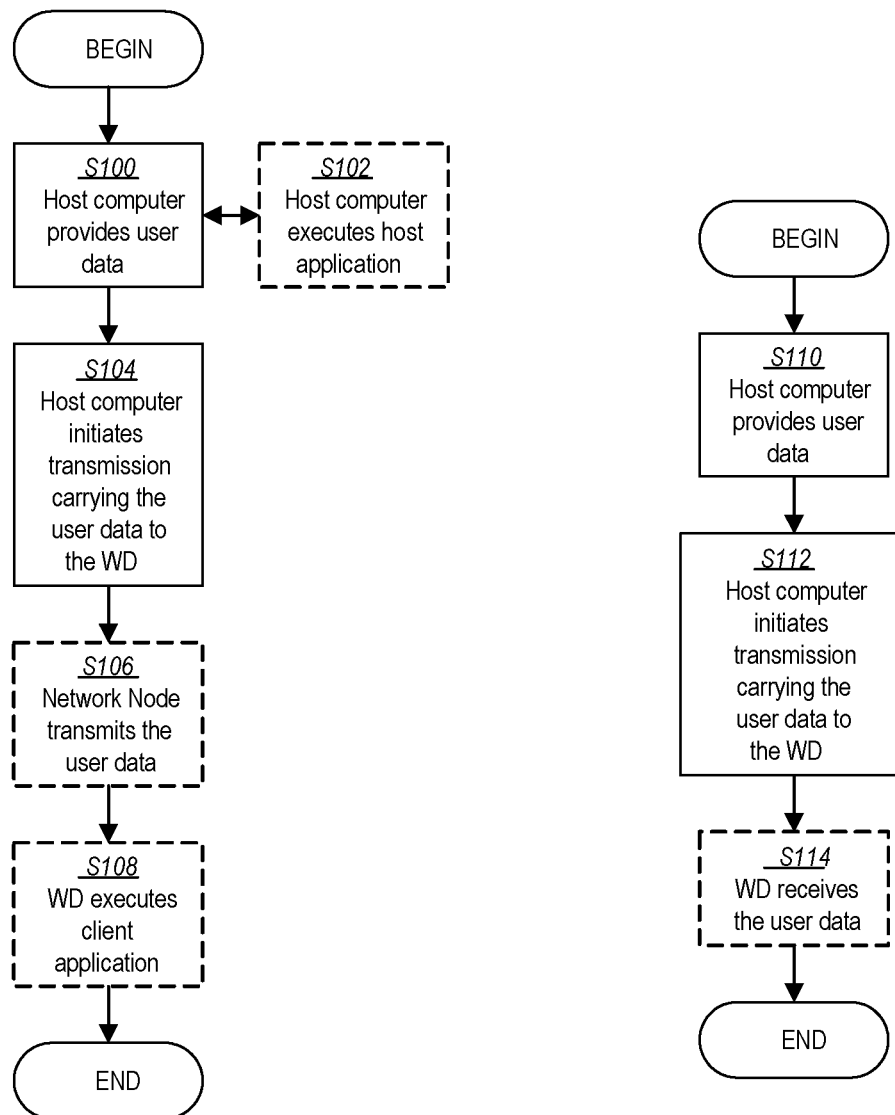

| R | Serving Cell ID | | | | | BWP ID | | | |
|---|---|---|---|---|---|---|---|---|---|
| | | | | | | | | | Oct 1 |
| $T_7=1$ | $T_6=0$ | $T_5=1$ | $T_4=1$ | $T_3=0$ | $T_2=1$ | $T_1=0$ | $T_0=0$ | | Oct 2 |
| $T_{15}=0$ | $T_{14}=0$ | $T_{13}=1$ | $T_{12}=0$ | $T_{11}=1$ | $T_{10}=0$ | $T_9=1$ | $T_8=1$ | | Oct 3 |
| $T_{23}=1$ | $T_{22}=0$ | $T_{21}=0$ | $T_{20}=1$ | $T_{19}=1$ | $T_{18}=1$ | $T_{17}=1$ | $T_{16}=0$ | | Oct 4 |
| $T_{31}=0$ | $T_{30}=0$ | $T_{29}=1$ | $T_{28}=1$ | $T_{27}=0$ | $T_{26}=1$ | $T_{25}=0$ | $T_{24}=0$ | | Oct 5 |

$T_2, T_4$: TCI states with ID 2 and 4 are mapped to codepoint 0

$T_5, T_7$: TCI states with ID 5 and 7 are mapped to codepoint 1

$T_8, T_9$: TCI states with ID 8 and 9 are mapped to codepoint 2

$T_{11}, T_{13}$: TCI states with ID 11 and 13 are mapped to codepoint 3

$T_{17}, T_{18}$: TCI states with ID 17 and 18 are mapped to codepoint 4

$T_{19}, T_{20}$: TCI states with ID 19 and 20 are mapped to codepoint 5

$T_{23}, T_{26}$: TCI states with ID 23 and 26 are mapped to codepoint 6

$T_{28}, T_{29}$: TCI states with ID 28 and 29 are mapped to codepoint 7

FIG. 15

| R | Serving Cell ID | | | | | BWP ID | | | |
|---|---|---|---|---|---|---|---|---|---|
| | | | | | | | | | Oct 1 |
| $T_7=1$ | $T_6=0$ | $T_5=1$ | $T_4=0$ | $T_3=0$ | $T_2=1$ | $T_1=0$ | $T_0=0$ | | Oct 2 |
| $T_{15}=0$ | $T_{14}=0$ | $T_{13}=1$ | $T_{12}=0$ | $T_{11}=1$ | $T_{10}=0$ | $T_9=1$ | $T_8=0$ | | Oct 3 |
| $T_{23}=1$ | $T_{22}=0$ | $T_{21}=0$ | $T_{20}=1$ | $T_{19}=1$ | $T_{18}=1$ | $T_{17}=0$ | $T_{16}=0$ | | Oct 4 |
| $T_{31}=0$ | $T_{30}=0$ | $T_{29}=1$ | $T_{28}=0$ | $T_{27}=0$ | $T_{26}=1$ | $T_{25}=0$ | $T_{24}=0$ | | Oct 5 |

$T_2$: TCI states with ID 2 are mapped to codepoint 0

$T_5, T_7$: TCI states with ID 5 and 7 are mapped to codepoint 1

$T_9$: TCI states with ID 9 are mapped to codepoint 2

$T_{11}, T_{13}$: TCI states with ID 11 and 13 are mapped to codepoint 3

$T_{18}$: TCI states with ID 18 are mapped to codepoint 4

$T_{19}$: TCI states with ID 19 are mapped to codepoint 5

$T_{23}, T_{26}$: TCI states with ID 23 and 26 are mapped to codepoint 6

$T_{29}$: TCI states with ID 29 are mapped to codepoint 7

FIG. 16

| R | Serving Cell ID | | | | | BWP ID | | Oct 1 |
|---|---|---|---|---|---|---|---|---|
| R | R | R | R | R | R | $S_1$ | $S_0$ | Oct 2 |
| $T_7$ | $T_6$ | $T_5$ | $T_4$ | $T_3$ | $T_2$ | $T_1$ | $T_0$ | Oct 3 |
| $T_{15}$ | $T_{14}$ | $T_{13}$ | $T_{12}$ | $T_{11}$ | $T_{10}$ | $T_9$ | $T_8$ | Oct 4 |

FIG. 17

| R | Serving Cell ID | | | | | BWP ID | | Oct 1 |
|---|---|---|---|---|---|---|---|---|
| $S_7$ | $S_6$ | $S_5$ | $S_4$ | $S_3$ | $S_2$ | $S_1$ | $S_0$ | Oct 2 |
| $T_7$ | $T_6$ | $T_5$ | $T_4$ | $T_3$ | $T_2$ | $T_1$ | $T_0$ | Oct 3 |
| $T_{15}$ | $T_{14}$ | $T_{13}$ | $T_{12}$ | $T_{11}$ | $T_{10}$ | $T_9$ | $T_8$ | Oct 4 |

FIG. 18

| R | Serving Cell ID | | | | | BWP ID | | | Oct 1 |
|---|---|---|---|---|---|---|---|---|---|
| $T_7=1$ | $T_6=0$ | $T_5=1$ | $T_4=1$ | $T_3=0$ | $T_2=1$ | $T_1=0$ | $T_0=0$ | | Oct 2 |
| $T_{15}=0$ | $T_{14}=0$ | $T_{13}=1$ | $T_{12}=0$ | $T_{11}=1$ | $T_{10}=0$ | $T_9=1$ | $T_8=1$ | | Oct 3 |
| $T_{23}=1$ | $T_{22}=0$ | $T_{21}=0$ | $T_{20}=1$ | $T_{19}=1$ | $T_{18}=1$ | $T_{17}=1$ | $T_{16}=0$ | | Oct 4 |
| $T_{31}=0$ | $T_{30}=0$ | $T_{29}=1$ | $T_{28}=1$ | $T_{27}=0$ | $T_{26}=1$ | $T_{25}=0$ | $T_{24}=0$ | | Oct 5 |

$T_2$, $T_4$: TCI states with ID 2 and 4 are mapped to codepoint 0

$T_5$, $T_7$: TCI states with ID 5 and 7 are mapped to codepoint 1

$T_8$, $T_9$: TCI states with ID 8 and 9 are mapped to codepoint 2

$T_{11}$, $T_{13}$: TCI states with ID 11 and 13 are mapped to codepoint 3

$T_{17}$, $T_{18}$: TCI states with ID 17 and 18 are mapped to codepoint 4

$T_{19}$, $T_{20}$: TCI states with ID 19 and 20 are mapped to codepoint 5

$T_{23}$, $T_{26}$: TCI states with ID 23 and 26 are mapped to codepoint 6

$T_{28}$, $T_{29}$: TCI states with ID 28 and 29 are mapped to codepoint 7

FIG. 19

| R | Serving Cell ID | | | | | BWP ID | | Oct 1 |
|---|---|---|---|---|---|---|---|---|
| $T_7=1$ | $T_6=0$ | $T_5=0$ | $T_4=0$ | $T_3=0$ | $T_2=1$ | $T_1=0$ | $T_0=0$ | Oct 2 |
| $T_{15}=0$ | $T_{14}=0$ | $T_{13}=1$ | $T_{12}=0$ | $T_{11}=0$ | $T_{10}=0$ | $T_9=1$ | $T_8=0$ | Oct 3 |
| $T_{23}=0$ | $T_{22}=0$ | $T_{21}=0$ | $T_{20}=1$ | $T_{19}=0$ | $T_{18}=0$ | $T_{17}=1$ | $T_{16}=0$ | Oct 4 |
| $T_{31}=0$ | $T_{30}=0$ | $T_{29}=0$ | $T_{28}=1$ | $T_{27}=0$ | $T_{26}=1$ | $T_{25}=0$ | $T_{24}=0$ | Oct 5 |

$T_2$: TCI states with ID 2 are mapped to codepoint 0

$T_7$: TCI states with ID 7 are mapped to codepoint 1

$T_9$: TCI states with ID 9 are mapped to codepoint 2

$T_{13}$: TCI states with ID 13 are mapped to codepoint 3

$T_{17}$: TCI states with ID 17 are mapped to codepoint 4

$T_{20}$: TCI states with ID 20 are mapped to codepoint 5

$T_{26}$: TCI states with ID 26 are mapped to codepoint 6

$T_{28}$: TCI states with ID 28 are mapped to codepoint 7

FIG. 20

MEDIUM ACCESS CONTROL (MAC) CONTROL ELEMENT SIGNALING FOR MULTI-TRANSMISSION POINT/MULTI PANEL PHYSICAL DOWNLINK SHARED CHANNEL TRANSMISSION

CROSS-REFERENCE TO RELATED APPLICATIONS

This application is a Submission Under 35 U.S.C. § 371 for U.S. National Stage Patent Application of International Application No. PCT/IB2020/050760, filed Jan. 30, 2020 entitled "MEDIUM ACCESS CONTROL (MAC) CONTROL ELEMENT SIGNALING FOR MULTI-TRANSMISSION POINT/MULTI PANEL PHYSICAL DOWNLINK SHARED CHANNEL TRANSMISSION," which claims priority to U.S. Provisional Application No. 62/799,898, filed Feb. 1, 2019, entitled "MEDIUM ACCESS CONTROL CONTROL ELEMENT SIGNALING FOR MULTI-TRANSMISSION POINT/MULTI PANEL PHYSICAL DOWNLINK SHARED CHANNEL TRANSMISSION," the entireties of both of which are incorporated herein by reference.

TECHNICAL FIELD

The present disclosure relates to wireless communications, and in particular, to a medium access control (MAC) control element (CE) for multi-transmission point (TRP)/multi-panel physical downlink shared channel (PDSCH) transmission.

BACKGROUND

New Radio

The latest generation mobile wireless communication system (Third Generation Partnership Project, 3GPP, Fifth Generation, 5G), also called New Radio (NR), supports a diverse set of use cases and a diverse set of deployment scenarios.

NR uses Cyclic Prefix Orthogonal Frequency Division Multiplexing (CP-OFDM) in the downlink (i.e., from a network node, gNB, eNB, or base station, to a wireless device or WD) and both CP-OFDM and discrete Fourier transform (DFT)-spread OFDM (DFT-S-OFDM) in the uplink (i.e., from WD to gNB). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe and each slot always consists of 14 OFDM symbols, irrespective of the subcarrier spacing.

Typical data scheduling in NR is on a per slot basis. An example is shown in FIG. 1 where the first two symbols contain the physical downlink control channel (PDCCH) and the remaining 12 symbols contains the physical data channel (PDCH), either a physical downlink shared channel (PDSCH) or a physical uplink shared channel (PUSCH).

Different subcarrier spacing values are supported in NR. The supported subcarrier spacing values (also referred to as different numerologies) are given by $\Delta f=(15 \times 2^\alpha)$ kHz where $\alpha$ is a non-negative integer. $\Delta f=15$ kHz is the basic subcarrier spacing that is also used in Long Term Evolution (LTE) radio access technology. Examples of the slot durations at different subcarrier spacings are shown in Table 1, where resource block (RB) bandwidth (BW) is resource block bandwidth.

TABLE 1

| Numerology | Slot length | RB BW |
| --- | --- | --- |
| 15 kHz | 1 ms | 180 kHz |
| 30 kHz | 0.5 ms | 360 kHz |
| 60 kHz | 0.25 ms | 720 kHz |
| 120 kHz | 125 µs | 1.44 MHz |
| 240 kHz | 62.5 µs | 2.88 MHz |

In the frequency domain physical resource definition, a system bandwidth is divided into resource blocks (RBs), each corresponding to 12 contiguous subcarriers. The common RBs (CRB) are numbered starting with 0 from one end of the system bandwidth. The WD is configured with one or up to four bandwidth parts (BWPs) which may be a subset of the RBs supported on a carrier. Hence, a BWP may start at a CRB larger than zero. All configured BWPs have a common reference, the CRB 0. Hence, a WD can be configured with a narrow BWP (e.g., 10 MHz) and a wide BWP (e.g., 100 MHz), but only one BWP can be active for the WD at a given point in time. The physical RBs (PRB) are numbered from 0 to N−1 within a BWP (but the 0:th PRB may thus be the K:th CRB where K>0).

The basic NR physical time-frequency resource grid is illustrated in FIG. 2, where only one resource block (RB) within a 14-symbol slot is shown. One OFDM subcarrier during one OFDM symbol interval forms one resource element (RE).

Downlink transmissions can be dynamically scheduled, i.e., in each slot the gNB transmits downlink control information (DCI) over the PDCCH about which WD data is to be transmitted and about which RBs in the current downlink slot the data is transmitted on. The PDCCH is typically transmitted in the first one or two OFDM symbols in each slot in NR. The WD data is carried on the PDSCH. A WD first detects and decodes the PDCCH and if the decoding is successful, the WD then decodes the corresponding PDSCH based on the decoded control information in the PDCCH.

Uplink data transmission can also be dynamically scheduled using the PDCCH. Similar to the downlink, a WD first decodes uplink grants in the PDCCH and then transmits data over the PUSCH based on the decoded control information in the uplink grant such as modulation order, coding rate, uplink resource allocation, etc.

Quasi Co-located and Transmission Configuration Indication (TCI) States

Several signals can be transmitted from the same base station antenna from different antenna ports. These signals can have the same large-scale properties, for instance in terms of Doppler shift/spread, average delay spread, or average delay, when measured at the receiver. These antenna ports are then said to be quasi co-located (QCL).

The network can then signal to the WD that two antenna ports are QCL. If the WD knows that two antenna ports are QCL with respect to a certain parameter (e.g., Doppler spread), the WD can estimate that parameter based on a reference signal transmitted on one of the antenna ports and use that estimate when receiving another reference signal or physical channel at another antenna port. Typically, the first antenna port is represented by a measurement reference signal such as a channel state information reference signal (CSI-RS) (known as source RS) and the second antenna port is a demodulation reference signal (DMRS) (known as target RS) for PDSCH or PDCCH reception.

For instance, if antenna ports A and B are QCL with respect to average delay, the WD can estimate the average delay from the signal received from antenna port A (known as the source reference signal (RS)) and assume that the signal received from antenna port B (target RS) has the same average delay. This is useful for demodulation since the WD can know beforehand the properties of the channel when trying to measure the channel utilizing the DMRS, which may help the WD in, for instance, selecting an appropriate channel estimation filter.

Information about what assumptions can be made regarding QCL is signaled to the WD from the network. In NR, four types of QCL relations between a transmitted source RS and transmitted target RS have been defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the WD can use the same receive (Rx) beam to receive them. This is helpful for a WD that uses analog beamforming to receive signals, since the WD needs to adjust its receive (RX) beam in some direction prior to receiving a certain signal. If the WD knows that the signal is spatially QCL with some other signal the WD has received earlier, then it can safely use the same RX beam to receive this signal, also. Note that for beam management, the discussion mostly revolves around QCL Type D, but it is also necessary to convey a Type A QCL relation for the RSs to the WD, so that the WD can estimate all the relevant large-scale parameters.

Typically, this is achieved by configuring the WD with a CSI-RS for tracking (TRS) for time/frequency offset estimation. To be able to use any QCL reference, the WD would have to receive the QCL reference with a sufficiently good signal to interference plus noise ratio (SINR). In many cases, this means that the TRS has to be transmitted in a suitable beam to a certain WD.

To introduce dynamics in beam and transmission point (TRP) selection, the WD can be configured through radio resource control (RRC) signaling with M TCI states, where M is up to 128 in frequency range 2 (FR2) for the purpose of PDSCH reception and up to 8 in FR1, depending on WD capability.

Each TCI state contains QCL information, i.e., one or two source downlink (DL) RSs, each source RS associated with a QCL type. For example, a TCI state contains a pair of reference signals, each associated with a QCL type, e.g., two different CSI-RSs {CSI-RS1, CSI-RS2} are configured in the TCI state as {qcl-Type1, qcl-Type2}={Type A, Type D}. This means that the WD can derive Doppler shift, Doppler spread, average delay, delay spread from CSI-RS1 and Spatial Rx parameter (i.e., the RX beam to use) from CSI-RS2.

Each of the M states in the list of TCI states can be interpreted as a list of M possible beams transmitted from the network or a list of M possible TRPs used by the network to communicate with the WD. The M TCI states can also be interpreted as a combination of one or multiple beams transmitted from one or multiple TRPs.

A first list of available TCI states is configured for PDSCH, and a second list of TCI states is configured for PDCCH. Each TCI state contains a pointer, known as TCI State ID, which points to the TCI state. The network then activates via MAC CE one TCI state for the PDCCH (i.e., provides a TCI for the PDCCH) and up to eight active TCI states for the PDSCH. The number of active TCI states the WD supports is a WD capability, but the maximum is 8 in some embodiments.

Each configured TCI state contains parameters for the quasi co-location associations between source reference signals, such as CSI-RS or synchronization signal/physical broadcast channel (SS/PBCH), and target reference signals (e.g., PDSCH/PDCCH DMRS ports). TCI states are also used to convey QCL information for the reception of CSI-RS.

Assume a WD is configured with 4 active TCI states (from a list of 64 total configured TCI states). Hence, 60 TCI states are inactive for this particular WD (but some may be active for another WD) and the WD need not be prepared to have large scale parameters estimated for those. The WD continuously tracks and updates the large scale parameters for the 4 active TCI states by measurements and analysis of the source RSs indicated by each TCI state. When scheduling a PDSCH to a WD, the downlink control information (DCI) contains a pointer to one active TCI. The WD then knows which large scale parameter estimate to use when performing PDSCH DMRS channel estimation and thus, PDSCH demodulation.

DMRS

Demodulation reference signals (DMRS) are used for coherent demodulation of physical layer data channels, the physical downlink shared channel (PDSCH) and the physical uplink shared channel (PUSCH), as well as of the physical downlink control channel (PDCCH). The DMRS is confined to resource blocks carrying the associated physical layer channel and is mapped on allocated resource elements of the OFDM time-frequency grid such that the receiver can efficiently handle time/frequency-selective fading radio channels.

The mapping of DMRS to resource elements is configurable in terms of density of both frequency and time domain, with two mapping types in the frequency domain (configuration type 1 or type 2) and two mapping types in the time domain (mapping type A or type B) defining the symbol position of the first DMRS within a transmission interval. The DMRS mapping in the time domain can further be single-symbol based or double-symbol based where the latter means that DMRS is mapped in pairs of two adjacent symbols. Furthermore, a WD can be configured with one, two, three or four single-symbol DMRS and one or two double-symbol DMRS. In scenarios with low Doppler, it may be sufficient to configure front-loaded DMRS only, i.e., one single-symbol DMRS or one double-symbol DMRS, whereas in scenarios with high Doppler additional DMRS may be required.

FIG. 3 shows examples of the mapping of front-loaded DMRS for configuration type 1 and type 2 with single-symbol and double-symbol DMRS and for the mapping type A with first DMRS in third symbol of a transmission interval of 14 symbols. It may be observed from this figure that type 1 and type 2 differs with respect to both the mapping structure and the number of supported DMRS code division multiplex (CDM) groups where type 1 support 2 CDM groups and Type 2 support 3 CDM groups.

The mapping structure of type 1 is sometimes referred to as a 2-comb structure with two CDM groups defined in the frequency domain by the set of subcarriers $\{0, 2, 4, \ldots\}$ and $\{1, 3, 5, \ldots\}$. The comb mapping structure is a prerequisite for transmissions requiring low peak to average power ratio (PAPR)/cubic metric (CM) and is thus used in conjunction with DFT-S-OFDM, whereas in CP-OFDM, both type 1 and type 2 mapping are supported.

A DMRS antenna port is mapped to the resource elements within one CDM group only. For single-symbol DMRS, two antenna ports can be mapped to each CDM group, whereas for double-symbol DMRS, four antenna ports can be mapped to each CDM group. Hence, the maximum number of DMRS ports for type 1 is either four or eight and for type 2 is either six or twelve. An orthogonal cover code (OCC) of length 2 ([+1, +1], [+1, −1]) is used to separate antenna ports mapped on the same resource elements within a CDM group. The OCC is applied in the frequency domain as well as in the time domain when double-symbol DMRS is configured.

In NR Standard (3$^{rd}$ Generation Partnership Project (3GPP)) Release-15, the mapping of a PDSCH DMRS sequence r(m), m=0, 1, ..., on antenna port $p_j$ and subcarrier k in OFDM symbol l for the numerology index µ is specified in Technical Specification (TS) 38.211 as $$a_{k,l}^{(p_j,\mu)} = \beta_{DMRS}^{PDSCH} r_\lambda^{(p_j)}(2n + k')$$

$$k = \begin{cases} 4n + 2k' + \Delta & \text{Configuration type1} \\ 6n + k' + \Delta & \text{Configuration type2} \end{cases}$$

$$k' = 0, 1$$

$$l = \bar{l} + l'$$

$$n = 0, 1, \ldots$$

where $$r_\lambda^{(p_j)}(2n+k') = w_f(k')w_t(l')r(2n+k')$$

represents the reference signal mapped on port $p_j$ in CDM group □ after applying OCC in frequency domain, $w_f(k')$, and time domain, $w_t(l')$. Table 2 and Table 3 show the PDSCH DMRS mapping parameters for configuration type 1 and type 2, respectively.

TABLE 2

| | CDM | | $w_f(k')$ | | $w_t(l')$ | |
|---|---|---|---|---|---|---|
| p | group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 3

| | CDM | | $w_f(k')$ | | $w_t(l')$ | |
|---|---|---|---|---|---|---|
| p | group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

Antenna Port Indication Tables

The downlink control information (DCI) contains a bit field (i.e., an Antenna Ports field) that selects which antenna ports and the number of antenna ports (i.e., the number of data layers) that are scheduled. For example, if port 1000 is indicated, then the PDSCH is a single layer transmission and the WD will use the DMRS defined by port 1000 to demodulate the PDSCH.

An example is shown in Table 4 for DMRS Type 1 and with a single front loaded DMRS symbol (maxLength=1). The DCI indicates a value and the number of DMRS ports are given by this value. This value also indicates the number of CDM groups without data, which means that if 1 is indicated, the other CDM group does contain data for the WD (PDSCH case). If the value indicates the number of CDM groups without data to be 2, then both CDM groups may contain DMRS ports and no data is mapped to the OFDM symbol containing the DMRS.

For DMRS Type 1 with a single front loaded DMRS symbol (maxLength=1), ports 1000 and 1001 are in CDM group λ=0, and ports 1002 and 1003 are in CDM group λ=1. This is also indicated in Table 4.

TABLE 4

| | One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Table 5 shows the corresponding table for DMRS Type 2 with a single front loaded DMRS symbol (maxLength=1). For DMRS Type 2, ports 1000 and 1001 are in CDM group λ=0; ports 1002 and 1003 are in CDM group λ=1; and ports 1004 and 1005 are in CDM group λ=2 This is also indicated in Table 5.

The DMRS tables for two front loaded DMRS symbols (maxLength=2) for DMRS types 1 and 2 are given in Tables 7.3.1.2.2-2 and 7.3.1.2.2-4 of the Third Generation Partnership Project (3GPP) Technical Specification (TS) 38.212, respectively.

TABLE 5

QCL Relation to DMRS CDM Groups

| One codeword: Codeword 0 enabled, Codeword 1 disabled | | | Two codewords: Codeword 0 enabled, Codeword 1 enabled | | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

In certain NR specifications, there is a restriction stating that the WD may assume that the PDSCH DMRS within the same CDM group are quasi co-located with respect to Doppler shift, Doppler spread, average delay, delay spread, and spatial Rx.

In cases where a WD is not scheduled on all DMRS ports within a CDM group, there may be another WD simultaneously scheduled, using the remaining ports of that CDM group. The WD can then estimate the channel for that other WD (an interfering signal) in order to perform coherent interference suppression. Hence, this may be useful in multi user, multiple input multiple output (MU-MIMO) scheduling and WD interference suppression.

TCI states Activation/Deactivation for WD-specific PDSCH via MAC CE

The details of the MAC CE signaling that is used to activate/deactivate TCI states for WD specific PDSCH are now provided. An example structure of the MAC CE for activating/deactivating TCI states for WD specific PDSCH is shown in FIG. 4.

As shown in FIG. 4, the MAC CE may contain the following fields:
  Serving Cell ID: This field indicates the identity of the Serving Cell for which the MAC CE applies. The length of the field is 5 bits;
  BWP ID: This field contains the ID corresponding to a downlink bandwidth part for which the MAC CE applies. The BWP ID is given by the higher layer parameter BWP ID as specified in 3GPP TS 38.331. The length of the BWP ID field is 2 bits since a WD can be configured with up to 4 BWPs for DL;
  A variable number of fields $T_i$: If the WD is configured with a TCI state with TCI State ID i, then the field $T_i$ indicates the activation/deactivation status of the TCI state with TCI State ID i. If the WD is not configured with a TCI state with TCI State ID i, the MAC entity should ignore the $T_i$ field. The $T_i$ field is set to "1" to indicate that the TCI state with TCI State ID i should be activated and mapped to the codepoint of the DCI Transmission Configuration Indication field, as specified in 3GPP TS 38.214. The $T_i$ field is set to "0" to indicate that the TCI state with TCI State ID i should be deactivated and is not mapped to the codepoint of the DCI Transmission Configuration Indication field. It should be noted that the codepoint to which the TCI State is mapped is determined by the ordinal position among all the TCI States with $T_i$ field set to "1". That is, the first TCI State with $T_i$ field set to "1" should be mapped to the codepoint value 0 of DCI Transmission Configuration Indication field, the second TCI State with $T_i$ field set to "1" should be mapped to the codepoint value 1 of DCI Transmission Configuration Indication field, and so on. In NR 3GPP Rel-15, the maximum number of activated TCI states is 8;
  A Reserved bit R: this bit is set to '0' in NR 3GPP Rel-15.

Note that the TCI States Activation/Deactivation for a WD-specific PDSCH MAC CE is identified by a MAC packet data unit (PDU) subheader with logical channel ID (LCID) as specified in Table 6.2.1-1 of 3GPP TS 38.321 (this table is reproduced below in Table 6). The MAC CE for Activation/Deactivation of TCI States for WD-specific PDSCH has variable size.

TABLE 6

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for WD-specific PDCCH |
| 53 | TCI States Activation/Deactivation for WD-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | WD Contention Resolution Identity |
| 63 | Padding |

An example of how the TCI States are mapped to the codepoints in the DCI Transmission Configuration Indication field in NR-Rel-15 is now given. The example is given in FIG. 5, where the MAC CE for Activation/Deactivation of TCI States for WD-specific PDSCH has a size of 3 octets and contains 16 $T_i$ fields corresponding to 16 different TCI State IDs (where i=0, 1, 2, ..., 15). In this example, TCI States with IDs i=2, 4, 5, 7, 8, 9, 11, and 13 are activated. This means the TCI State IDs are mapped to the codepoint values of DCI Transmission Configuration Indication field as follows:

TCI State iD i=2 corresponds to codepoint value 0;
TCI State iD i=4 corresponds to codepoint value 1;
TCI State iD i=5 corresponds to codepoint value 2;
TCI State iD i=7 corresponds to codepoint value 3;
TCI State iD i=8 corresponds to codepoint value 4;
TCI State iD i=9 corresponds to codepoint value 5;
TCI State iD i=11 corresponds to codepoint value 6; and
TCI State iD i=13 corresponds to codepoint value 7.

NR Rel-16 Enhancements for PDSCH with Multi-TRPs

In NR 3GPP Rel-16, there are discussions ongoing as to the support of PDSCH with multi-TRP. One variant that is being considered is a single PDCCH scheduling of multiple PDSCH from different TRPs. The single PDCCH is received from one of the TRPs. FIG. 6 shows an example where a DCI received by the WD in PDCCH from TRP1 schedules two PDSCHs. The first PDSCH (PDSCH1) is received from TRP1 and the second PDSCH (PDSCH2) is received from TRP2. In such cases, each PDSCH transmitted from a different TRP may have a different TCI state associated with it. In the example of FIG. 6, PDSCH1 is associated with TCI State p, and PDSCH 2 is associated with TCI state q. The PDSCH DMRSs from the different TRPs may belong to different DMRS CDM groups. In the example of FIG. 6, the DMRS for PDSCH1 belongs to CDM group u while the DMRS for PDSCH2 belongs to CDM group v.

The following has been considered:
The TCI indication framework shall be enhanced in Rel-16 at least for enhanced Mobile Broadband (eMBB):
Each TCI code point in a DCI can correspond to 1 or 2 TCI states:
  a) When 2 TCI states are activated within a TCI code point, each TCI state corresponds to one CDM group, at least for DMRS type 1; and
  b) For future study (FFS): design for DMRS type 2;
FFS: TCI field in DCI, and associated MAC-CE signaling impact
According to the above, each codepoint in the DCI Transmission Configuration Indication field can be mapped to either 1 or 2 TCI states. This can be interpreted as follows:
A DCI in PDCCH schedules 1 or 2 PDSCHs with each PDSCH associated with a different TCI state; the codepoint of the Transmission Configuration Indication field in DCI indicates the 1-2 TCI states associated with the 1 or 2 PDSCHs scheduled.
Additionally, according to the above, at least for DMRS type 1, PDSCH DMRS associated with one TCI state are contained within one DMRS CDM group.

SUMMARY

Some embodiments advantageously provide methods, wireless devices and network nodes for using a medium access control (MAC) control element (CE) for multi-transmission point (TRP)/multi-panel physical downlink shared channel (PDSCH) transmission.

Some embodiments allow mapping multiple TCI states to a single codepoint in the DCI Transmission Configuration Indication field via a MAC CE. Hence, some embodiments may be suitable for wireless communication technology use and enhancements, such as NR 3GPP Rel-16 PUSCH enhancements, with multiple-TRPs.

According to one aspect of the present disclosure, a method implemented in a network node is provided. The method includes transmitting within a medium access control, MAC, control element, CE, message, to a wireless device, WD, an indication of a plurality $K_j$ of Transmission Configuration Indication, TCI, states that are mapped to a single codepoint, j, in a downlink control information, DCI, Transmission Configuration Indication, TCI, field, $K_j$ and j being integers; and transmitting within the MAC CE message, to the wireless device, the number $K_j$ of TCI states being mapped to the codepoint j.

In some embodiments of this aspect, j is an integer in a set of integers {0, 1, 2, ..., N} and there is a plurality of N+1 codepoints in the DCI TCI field. In some embodiments of this aspect, for each codepoint in the plurality of codepoints, the number $K_j$ of TCI states has a value from a plurality of possible values. In some embodiments of this aspect, TCI states represented by non-consecutive fields in the MAC CE are assigned to the codepoint j in the DCI TCI field. In some embodiments of this aspect, the MAC CE message is identified by a MAC packet data unit, PDU, subheader having a first logical channel identity, LCID, the first LCID being different from a second LCID, the second LCID being used to identify TCI state activation/deactivation for a WD-specific physical downlink shared channel, PDSCH, MAC CE as defined in Third Generation Partnership Project, 3GPP, Release 15.

According to another aspect of the present disclosure, a network node configured to communicate with a wireless device, WD, is provided. The network node includes processing circuitry. The processing circuitry is configured to cause the network node to transmit within a medium access control, MAC, control element, CE, message, to the WD, an indication of a plurality $K_j$ of Transmission Configuration Indication, TCI, states that are mapped to a single codepoint, j, in a downlink control information, DCI, Transmission Configuration Indication, TCI, field, $K_j$ and j being integers; and transmit within the MAC CE message, to the wireless device, the number $K_j$ of TCI states being mapped to the codepoint j.

In some embodiments of this aspect, j is an integer in a set of integers {0, 1, 2, ..., N} and there is a plurality of N+1 codepoints in the DCI TCI field. In some embodiments of this aspect, for each codepoint in the plurality of codepoints, the number $K_j$ of TCI states has a value from a plurality of possible values. In some embodiments of this aspect, TCI states represented by non-consecutive fields in the MAC CE are assigned to the codepoint j in the DCI TCI field. In some embodiments of this aspect, the MAC CE message is identified by a MAC packet data unit, PDU, subheader having a first logical channel identity, LCID, the first LCID being different from a second LCID, the second LCID being used to identify TCI state activation/deactivation for a WD-specific physical downlink shared channel, PDSCH, MAC CE as defined in Third Generation Partnership Project, 3GPP, Release 15.

According to yet another aspect of the present disclosure, a method implemented in a wireless device, WD, is provided. The method includes receiving within a medium access control, MAC, control element, CE, message, from a network node, an indication of a plurality $K_j$ of Transmission Configuration Indication, TCI, states that are mapped to a single codepoint, j, in a downlink control information, DCI, Transmission Configuration Indication, TCI, field, $K_j$ and j being integers; and receiving within the MAC CE message, from the network node, the number $K_j$ of TCI states being mapped to the codepoint j.

In some embodiments of this aspect, the method further includes selecting a TCI state based on an indication of at least one demodulation reference signal, DMRS, port in an antenna ports field in the DCI. In some embodiments of this aspect, j is an integer in a set of integers {0, 1, 2, ..., N} and there is a plurality of N+1 codepoints in the DCI TCI field. In some embodiments of this aspect, for each codepoint in the plurality of codepoints, the number $K_j$ of TCI states has a value from a plurality of possible values. In some embodiments of this aspect, TCI states represented by non-consecutive fields in the MAC CE are assigned to the codepoint j in the DCI TCI field. In some embodiments of this aspect, the MAC CE message is identified by a MAC packet data unit, PDU, subheader having a first logical channel identity, LCID, the first LCID being different from a second LCID, the second LCID being used to identify TCI state activation/deactivation for a WD-specific physical downlink shared channel, PDSCH, MAC CE as defined in Third Generation Partnership Project, 3GPP, Release 15.

According to another aspect of the present disclosure, a wireless device, WD, configured to communicate with a network node is provided. The wireless device includes processing circuitry. The processing circuitry is configured to cause the wireless device to receive within a medium access control, MAC, control element, CE, message, from the network node, an indication of a plurality $K_j$ of Transmission Configuration Indication, TCI, states that are mapped to a single codepoint, j, in a downlink control information, DCI, Transmission Configuration Indication, TCI, field, $K_j$ and j being integers; and receive within the MAC CE message, from the network node, the number $K_j$ of TCI states being mapped to the codepoint j.

In some embodiments of this aspect, the processing circuitry is further configured to select a TCI state based on an indication of at least one demodulation reference signal, DMRS, port in an antenna ports field in the DCI. In some embodiments of this aspect, j is an integer in a set of integers {0, 1, 2, ..., N} and there is a plurality of N+1 codepoints in the DCI TCI field. In some embodiments of this aspect, for each codepoint in the plurality of codepoints, the number $K_j$ of TCI states has a value from a plurality of possible values. In some embodiments of this aspect, TCI states represented by non-consecutive fields in the MAC CE are assigned to the codepoint j in the DCI TCI field. In some embodiments of this aspect, the MAC CE message is identified by a MAC packet data unit, PDU, subheader having a first logical channel identity, LCID, the first LCID being different from a second LCID, the second LCID being used to identify TCI state activation/deactivation for a WD-specific physical downlink shared channel, PDSCH, MAC CE as defined in Third Generation Partnership Project, 3GPP, Release 15.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

FIG. 3 shows mapping of front-loaded DMRS for configuration type 1 and type 2 with single-symbol and double-symbol DMRS and for the mapping type A with first DMRS in third symbol of a transmission interval of 14 symbols;

FIG. 5 shows an alternative MAC CE;

FIG. 9 is a flowchart illustrating exemplary methods implemented in a communication system including a host computer, a network node and a wireless device for executing a client application at a wireless device according to some embodiments of the present disclosure;

FIG. 10 is a flowchart illustrating exemplary methods implemented in a communication system including a host computer, a network node and a wireless device for receiving user data at a wireless device according to some embodiments of the present disclosure;

FIG. 15 is a diagram of a MAC CE according to a first embodiment;

FIG. 16 is a diagram of a MAC CE according to a second embodiment;

FIG. 17 is a diagram of a MAC CE according to a third embodiment;

FIG. 18 a diagram of an alternative MAC CE according to the third embodiment;

FIG. 19 is a diagram of a MAC CE according to a fourth embodiment; and

FIG. 20 a diagram of a MAC CE according to a fifth embodiment.

DETAILED DESCRIPTION

Figure 1:
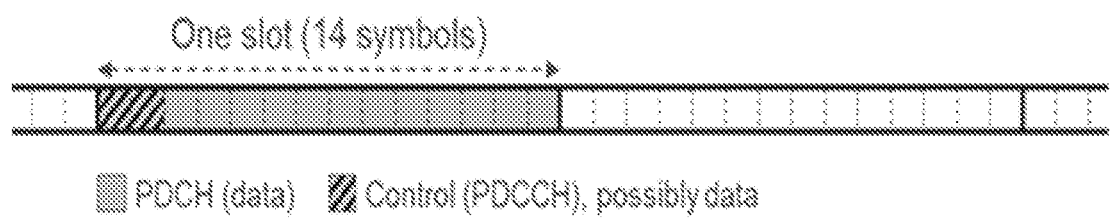
FIG. 1 illustrates a slot having PDCH data and control data in New Radio.
Figure 2:
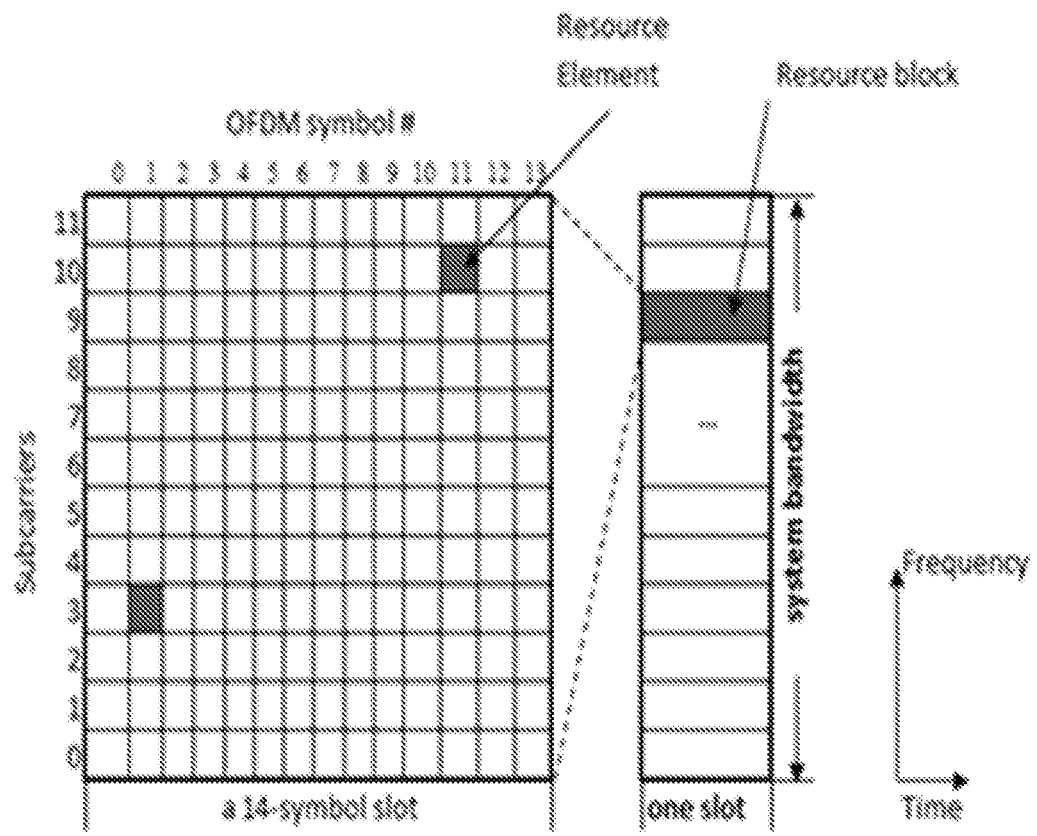
FIG. 2 illustrates a NR physical time-frequency resource grid.
Figure 4:
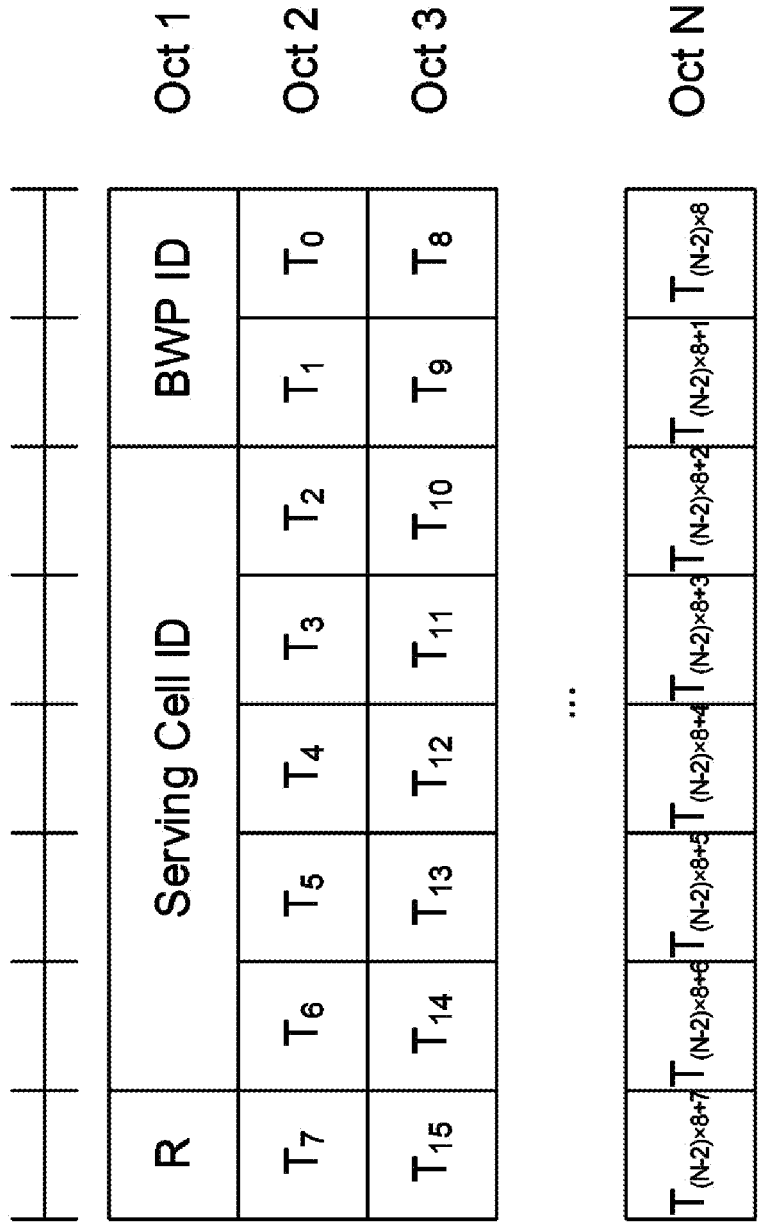
FIG. 4 shows a MAC CE.
Figure 6:
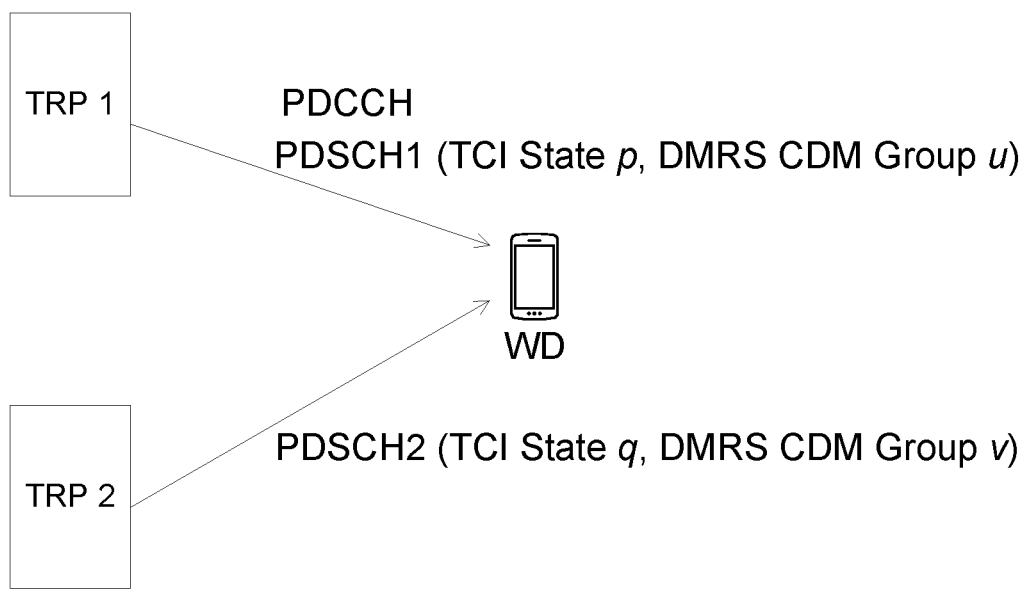
FIG. 6 shows an example where a DCI received by the WD in PDCCH from TRP1 schedules two PDSCHs.

As discussed above, in the NR 3GPP Rel-15 MAC CE for TCI States Activation/Deactivation for WD-specific PDSCH, a single codepoint of the DCI Transmission Configuration Indication field can only be mapped to a single TCI State. The NR 3GPP Rel-15 MAC CE for TCI States that Activation/Deactivation for WD-specific PDSCH cannot be used for NR 3GPP Rel-16 PUSCH enhancements with multiple-TRPs where one codepoint in the DCI Transmission Configuration Indication field needs to be mapped to either 1 or 2 TCI states. Hence, a problem exists as to how to use a MAC CE to map multiple TCI states to a single codepoint in the DCI Transmission Configuration Indication field.

Before describing in detail exemplary embodiments, it is noted that the embodiments reside primarily in combinations of apparatus components and processing steps related to medium access control (MAC) control element (CE) for multi-transmission point (TRP)/multi-panel physical downlink shared channel (PDSCH) transmission. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, integrated access and backhaul (IAB), radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (WD) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, integrated access and backhaul (IAB), access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are configured to map a single codepoint in a DCI Transmission Configuration Indication, TCI, field to a multiple number of TCI states represented by multiple fields set to a value of '1' in a medium access control, MAC, control element, CE, message.

Figure 7:
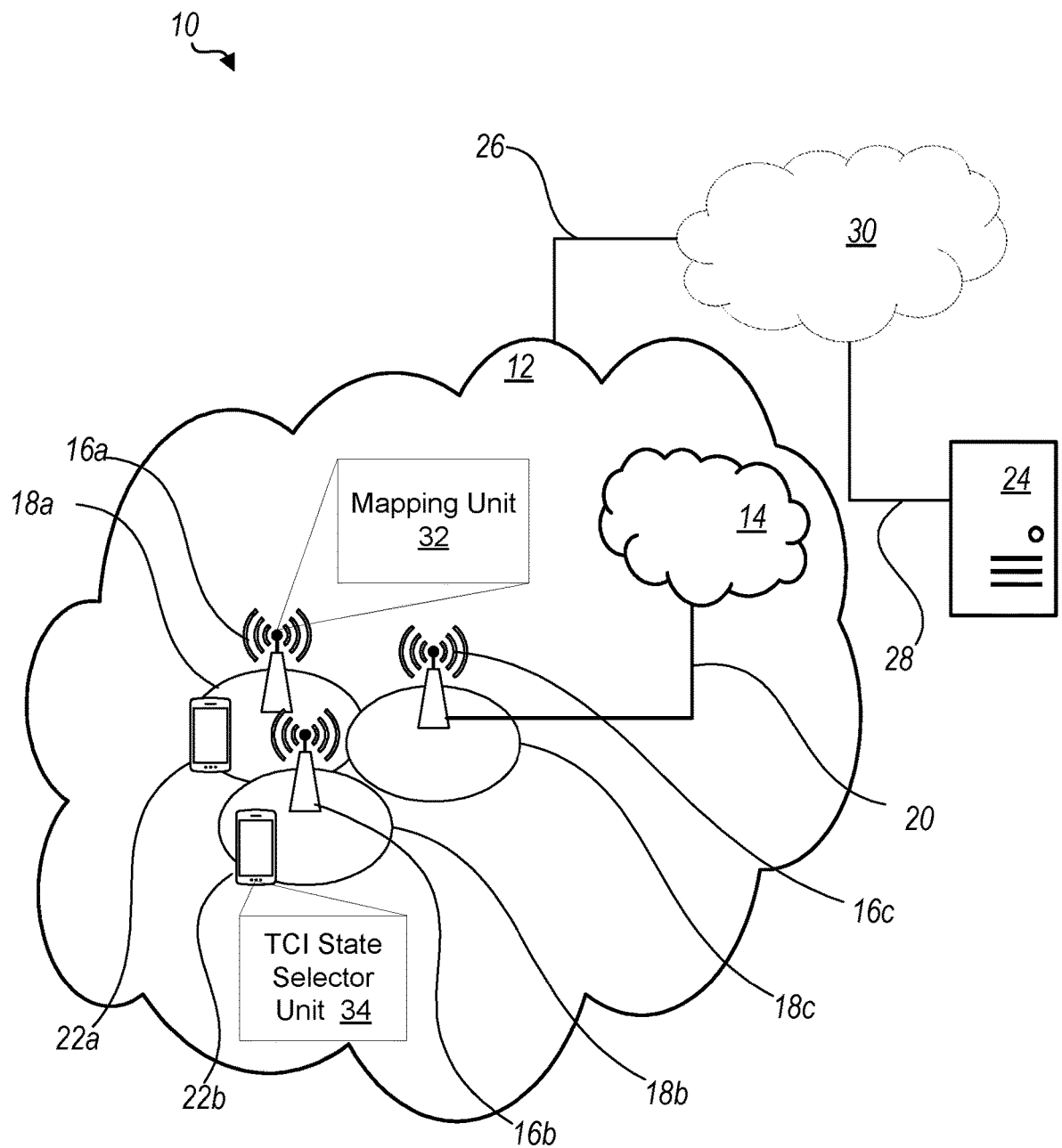
FIG. 7 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNB s, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

In some embodiments, a network node 16 is configured to include a mapping unit 32 which is configured to cause the network node 16 to transmit within a medium access control, MAC, control element, CE, message, to the WD, an indication of a plurality $K_j$ of Transmission Configuration Indication, TCI, states that are mapped to a single codepoint, j, in a downlink control information, DCI, Transmission Configuration Indication, TCI, field, $K_j$ and j being integers; and cause the network node 16 to transmit within the MAC CE message, to the wireless device 22, the number $K_j$ of TCI states being mapped to the codepoint j. In some embodiments, the mapping unit 32 in processing circuitry 68 is configured to, in conjunction with the radio interface 62, cause the network node 16 to transmit the MAC CE message to indicate a mapping between a codepoint and a plurality of TCI states according to one or more of the embodiments in the present disclosure. In some embodiments, a network node 16 is configured to include a mapping unit 32 which is configured to map a single codepoint in a downlink message, e.g., DCI Transmission Configuration Indication, TCI, field to a multiple number of transmission states, e.g., TCI states represented by multiple fields set to a value of '1' in a medium access control, MAC, control element, CE, message.

In some embodiments, a wireless device 22 is configured to include a TCI state selector unit 34 which is configured to cause the wireless device 22 to receive within a medium access control, MAC, control element, CE, message, from the network node, an indication of a plurality $K_j$ of Transmission Configuration Indication, TCI, states that are mapped to a single codepoint, j, in a downlink control information, DCI, Transmission Configuration Indication, TCI, field, $K_j$ and j being integers; and cause the wireless device 22 to receive within the MAC CE message, from the network node 16, the number $K_j$ of TCI states being mapped to the codepoint j. In some embodiments, the wireless device 22 is configured to include a TCI state selector unit 34 which is configured to select a TCI state based on an indication of DMRS ports in an Antenna Ports field in the DCI.

Example implementations, in accordance with an embodiment, of the WD 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16, such as the processes described with reference to the flowchart in FIG. 13. For example, processing circuitry 68 of the network node 16 may include mapping unit 32 configured to map a single codepoint in a downlink message, e.g., DCI Transmission Configuration Indication, TCI, field to a multiple number of transmission states, e.g., TCI states represented by multiple fields set to a value of '1' in a medium access control, MAC, control element, CE, message.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22, such as the processes described with reference to the flowchart in FIG. 14. The WD has a TCI state selector unit 34 which is configured to select a TCI state based on an indication of DMRS ports in an Antenna Ports field in the DCI.

Figure 8:
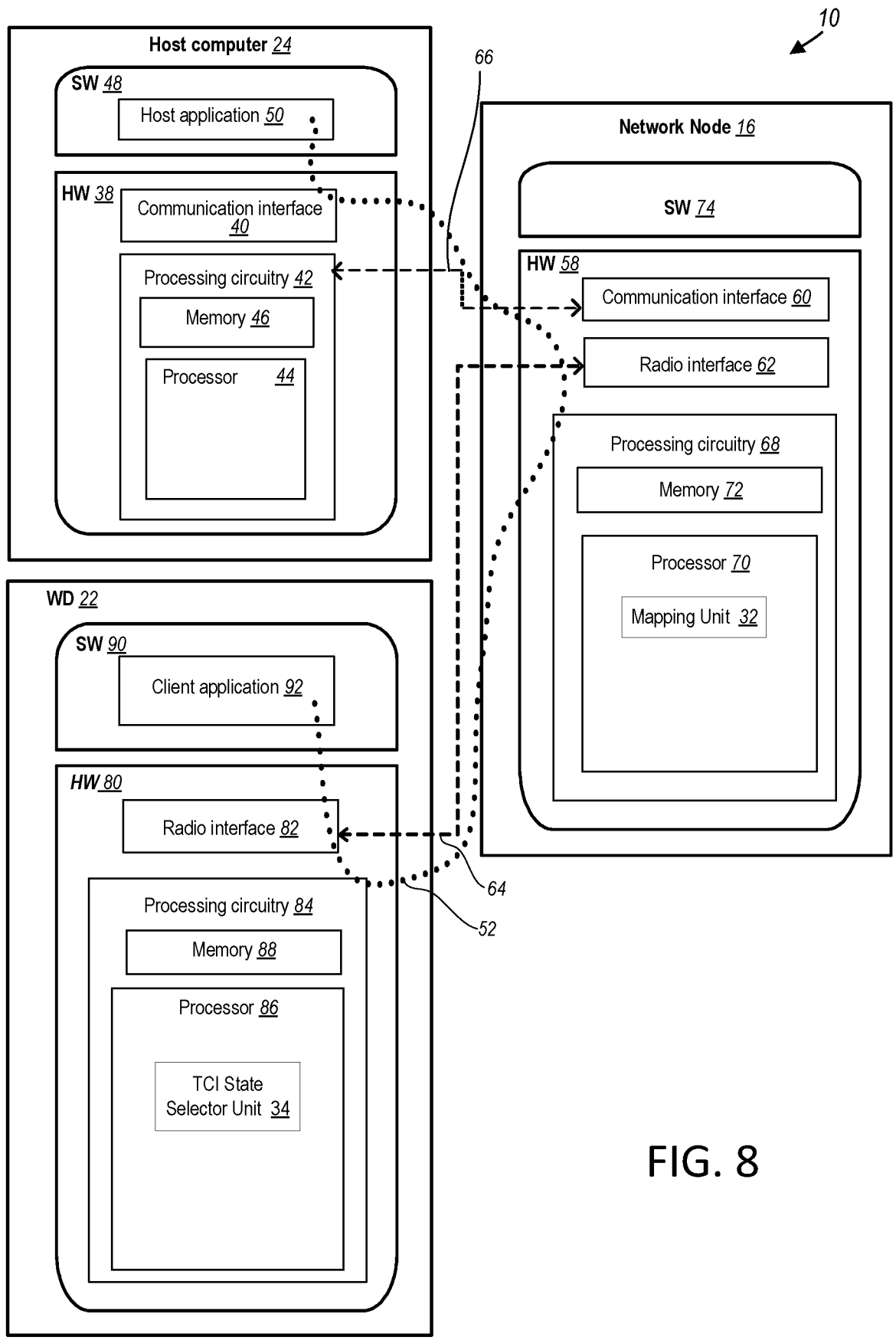
FIG. 8 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 8 and independently, the surrounding network topology may be that of FIG. 7.

In FIG. 8, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 8 show various "units" such as mapping unit 32 and TCI selector unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 9 is a flowchart illustrating an exemplary method implemented in a communication system, such as, for example, the communication system of FIGS. 7 and 8, in accordance with one embodiment. The communication system may include a host computer 24, a network node 16 and a WD 22, which may be those described with reference to FIG. 8. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 10 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 11:
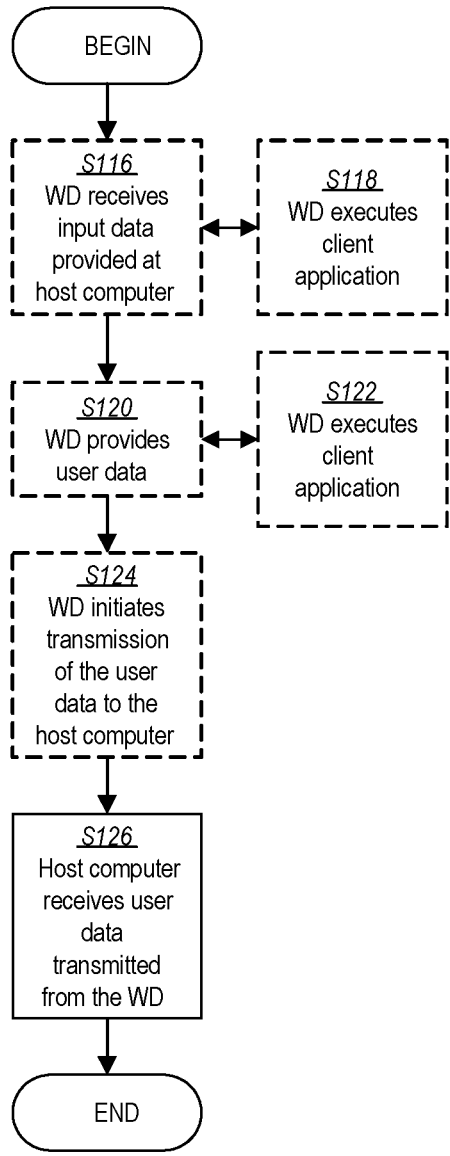
FIG. 11 is a flowchart illustrating exemplary methods implemented in a communication system including a host computer, a network node and a wireless device for receiving user data from the wireless device at a host computer according to some embodiments of the present disclosure.

FIG. 11 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 12:
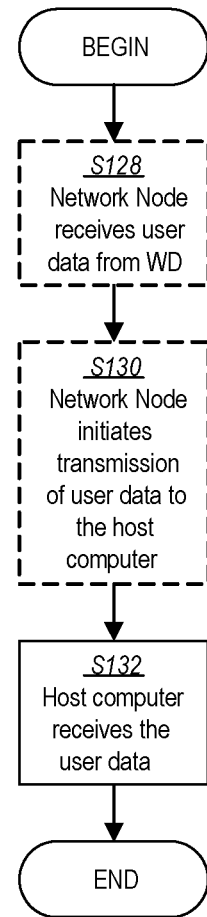
FIG. 12 is a flowchart illustrating exemplary methods implemented in a communication system including a host computer, a network node and a wireless device for receiving user data at a host computer according to some embodiments of the present disclosure.

FIG. 12 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 13:
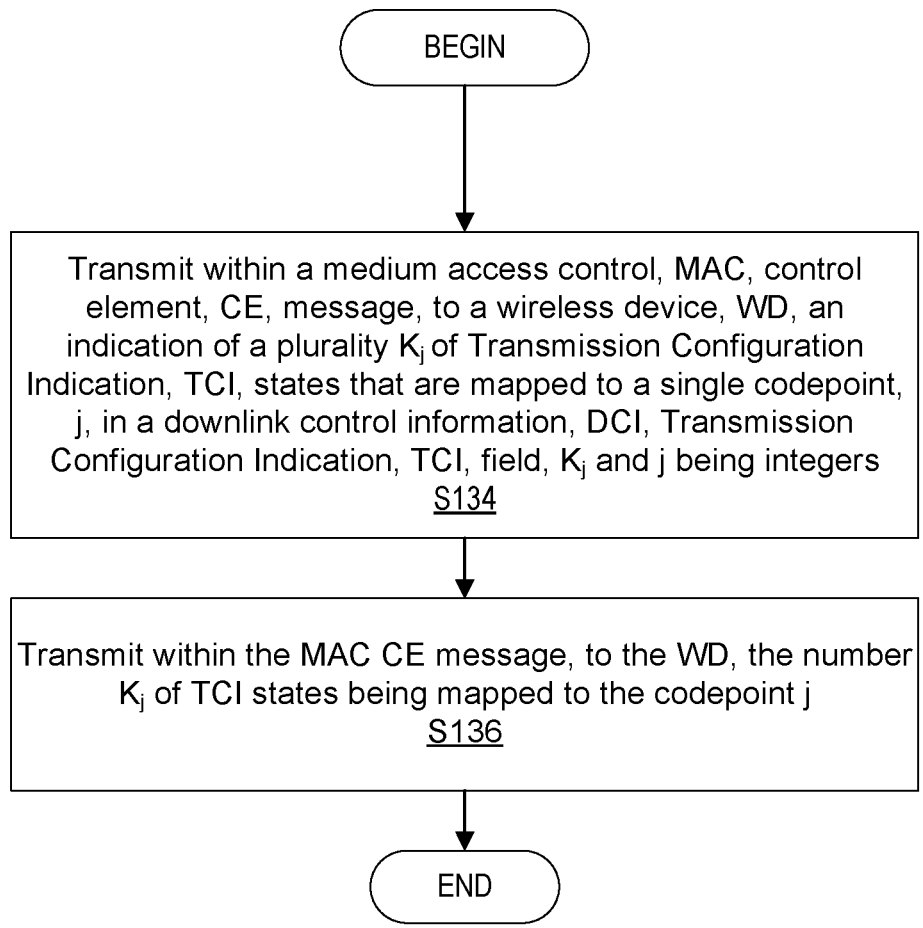
FIG. 13 is a flowchart of an exemplary process in a network node according to some embodiments of the present disclosure.

FIG. 13 is a flowchart of an exemplary process in a network node 16 for medium access control (MAC) control element (CE) for multi-transmission point (TRP)/multi-panel physical downlink shared channel (PDSCH) transmission in accordance with the principles of the present disclosure. In some embodiments, one or more blocks described herein may be performed by one or more elements of network node 16 such as by one or more of processing circuitry 68 (including the mapping unit 32), processor 70, radio interface 62 and/or communication interface 60. Network node 16 such as via processing circuitry 68 and/or processor 70 and/or radio interface 62 and/or communication interface 60 is configured to cause the network node 16 to transmit within a medium access control, MAC, control element, CE, message, to the WD 22, an indication of a plurality $K_j$ of Transmission Configuration Indication, TCI, states that are mapped to a single codepoint, j, in a downlink control information, DCI, Transmission Configuration Indication, TCI, field, $K_j$ and j being integers. Network node 16 such as via processing circuitry 68 and/or processor 70 and/or radio interface 62 and/or communication interface 60 is configured to cause the network node 16 to transmit within the MAC CE message, to the wireless device 22, the number $K_j$ of TCI states being mapped to the codepoint j.

In some embodiments, j is an integer in a set of integers {0, 1, 2, . . . , N} and there is a plurality of N+1 codepoints in the DCI TCI field. In some embodiments, for each codepoint in the plurality of codepoints, the number $K_j$ of TCI states has a value from a plurality of possible values. In some embodiments, TCI states represented by non-consecutive fields in the MAC CE are assigned to the codepoint j in the DCI TCI field. In some embodiments, the MAC CE message is identified by a MAC packet data unit, PDU, subheader having a first logical channel identity, LCID, the first LCID being different from a second LCID, the second LCID being used to identify TCI state activation/deactivation for a WD-specific physical downlink shared channel, PDSCH, MAC CE as defined in Third Generation Partnership Project, 3GPP, Release 15.

In some embodiments, network node 16 such as via processing circuitry 68 and/or processor 70 and/or radio interface 62 and/or communication interface 60 is configured to map a single codepoint in a downlink message, e.g., DCI Transmission Configuration Indication, TCI, field to a multiple number K of transmission states, e.g., TCI states represented by multiple fields set to a value of '1' in a medium access control, MAC, control element, CE, message (Block S134).

Figure 14:
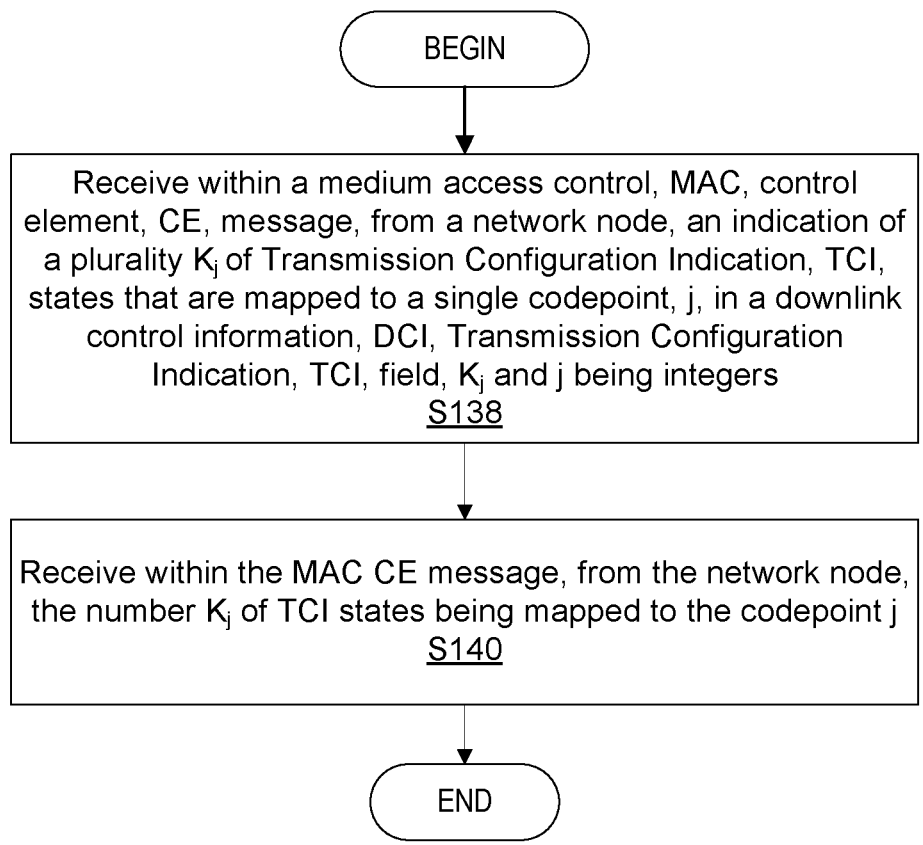
FIG. 14 is a flowchart of an exemplary process in a wireless device according to some embodiments of the present disclosure.

FIG. 14 is a flowchart of an exemplary process in wireless device 22 for TCI state selection. In some embodiments, one or more blocks described herein may be performed by one or more elements of wireless device 22 such as by one or more of processing circuitry 84 (including the TCI state selector unit 34), processor 86, radio interface 82 and/or communication interface 60. Wireless device 22 such as via processing circuitry 84 and/or processor 86 and/or radio interface 82 is configured to cause the wireless device 22 to receive within a medium access control, MAC, control element, CE, message, from the network node 16, an indication of a plurality $K_j$ of Transmission Configuration Indication, TCI, states that are mapped to a single codepoint, j, in a downlink control information, DCI, Transmission Configuration Indication, TCI, field, $K_j$ and j being integers. Wireless device 22 such as via processing circuitry 84 and/or processor 86 and/or radio interface 82 is configured to cause the wireless device 22 to receive within the MAC CE message, from the network node 16, the number $K_j$ of TCI states being mapped to the codepoint j.

In some embodiments, the processing circuitry 84 and/or processor 86 is further configured to select a TCI state based on an indication of at least one demodulation reference signal, DMRS, port in an antenna ports field in the DCI. In some embodiments, j is an integer in a set of integers {0, 1, 2, . . . , N} and there is a plurality of N+1 codepoints in the DCI TCI field. In some embodiments, for each codepoint in the plurality of codepoints, the number $K_j$ of TCI states has a value from a plurality of possible values. In some embodiments, TCI states represented by non-consecutive fields in the MAC CE are assigned to the codepoint j in the DCI TCI field. In some embodiments, the MAC CE message is identified by a MAC packet data unit, PDU, subheader having a first logical channel identity, LCID, the first LCID being different from a second LCID, the second LCID being used to identify TCI state activation/deactivation for a WD-specific physical downlink shared channel, PDSCH, MAC CE as defined in Third Generation Partnership Project, 3GPP, Release 15.

In some embodiments, wireless device 22 such as via processing circuitry 84 and/or processor 86 and/or radio interface 82 is configured to receive by signaling from the network node, a mapping of a single codepoint in a downlink message, e.g., downlink control information, DCI, Transmission Configuration Indication, TCI, field to a multiple number K of transmission states, e.g., TCI states represented by multiple fields set to a value of '1' in a medium access control, MAC, control element, CE, message (Block S136). The TCI state selector unit 34 is configured to select a TCI state based on an indication of DMRS ports in an Antenna Ports field in the DCI (Block S138).

Having described the general process flow of arrangements of the disclosure and having provided examples of hardware and software arrangements for implementing the processes and functions of the disclosure, the sections below provide details and examples of arrangements for a medium access control (MAC) control element (CE) for multi-transmission point (TRP)/multi-panel physical downlink shared channel (PDSCH) transmission.

EMBODIMENT 1

In this embodiment, the number of TCI states to be mapped by mapping unit 32 to a single codepoint in the DCI Transmission Configuration Indication field via a varying size MAC CE is configured to the WD 22 via higher layer signaling (for example, RRC signaling) via the radio interface 62. Denoting this configured number of TCI states per codepoint as K, in this embodiment, K TCI states are mapped to each of the codepoints in the DCI Transmission Configuration Indication field. That is, the first K TCI States with $T_i$ field set to "1" shall be mapped, via the mapping unit 32, to the codepoint value 0 of DCI Transmission Configuration Indication field, the second K TCI States with $T_i$ field set to "1" shall be mapped to the codepoint value 1 of DCI Transmission Configuration Indication field, and so on. In this embodiment, the maximum number of activated TCI states is 8*K.

An example of this embodiment is given in FIG. 15, where the MAC CE has a size of 5 octets and contains 32 $T_i$ fields corresponding to 32 different TCI State IDs (where i=0, 1, 2, . . . , 31). The number of TCI states per codepoint as K is assumed to be 2 in this example. In this example, TCI States with IDs i=2, 4, 5, 7, 8, 9, 11, 13, 17, 18, 19, 20, 23, 26, 28 and 29 are activated. This means that K=2 activated TCI State IDs are mapped, via mapping unit 32, to each codepoint values of DCI Transmission Configuration Indication field as follows:

TCI State IDs i=2 and 4 correspond to codepoint value 0;
TCI State IDs i=5 and 7 correspond to codepoint value 1;
TCI State IDs i=8 and 9 correspond to codepoint value 2;
TCI State IDs i=11 and 13 correspond to codepoint value 3;
TCI State IDs i=17 and 18 correspond to codepoint value 4;
TCI State IDs i=19 and 20 correspond to codepoint value 5;
TCI State IDs i=23 and 26 correspond to codepoint value 6; and
TCI State IDs i=28 and 29 correspond to codepoint value 7.

In some cases, the mapping of specific TCI states to the MAC CE bits and therefore to the DCI codepoint may be predetermined and fixed in the specification. In some other cases, the mapping can also be per RRC configuration to select the TCI states.

In some cases, it may be beneficial to dynamically switch between receiving from one or two TRPs. Hence, even though the DCI Transmission Configuration Indication field indicates K active TCI states, a mechanism may be provided in this embodiment to dynamically choose one or more among the K TCI states indicated by the Transmission Configuration Indication field.

In some variants of this embodiment, the dynamic choice of one or more among the K TCI states may be made based at least in part on the information indicated in the Antenna Ports field in DCI. If the DMRS ports indicated in the Antenna Ports field in DCI are limited to a single DMRS CDM group, then the WD 22 assumes only one of the K TCI states (for example, the first of the K TCI states) for PDSCH reception. If the DMRS ports indicated in the Antenna Ports field in DCI belong to two DMRS CDM group, then the WD 22 assumes two of the K TCI states (for example, the first two of the K TCI states) for PDSCH reception.

In a variant of this embodiment, K=4 and the reserved bit R in the first octet is used to select two first or two last TCI states to be further selected by the Antenna Ports field in the DCI as described above. An advantage of this arrangement is that as RRC is relatively slow, this gives a faster option to switch between two sets of TCI states.

EMBODIMENT 2

Similar to Embodiment 1, in this embodiment, the number of TCI states to be mapped to a single codepoint in the DCI Transmission Configuration Indication field via MAC CE is configured to the WD 22 via higher layer signaling (for example, RRC signaling). However, Embodiment 2 differs from Embodiment 1 in that a different number of TCI states can be mapped to the different codepoints. This can be done, for example, by higher layer configuring of the WD 22 with a list where each entry in the list provides the number of TCI states applicable to different codepoints.

For example, the list can be given by $\{K_0, K_1, \ldots, K_7\}$ where the configured number of TCI states per codepoint j (where j=0, 1, 2, . . . , 7) is given by $K_j$. In this embodiment, $K_j$ TCI states are mapped to the $j^{th}$ codepoint in the DCI Transmission Configuration Indication field.

The first $K_0$ TCI States with $T_i$ field set to "1" shall be mapped to the codepoint value 0 of DCI Transmission Configuration Indication field, the second $K_1$ TCI States with $T_i$ field set to "1" shall be mapped to the codepoint value 1 of DCI Transmission Configuration Indication field, and so on. In this embodiment, the maximum number of activated TCI states is $\Sigma_j K_j$.

An example of this embodiment is shown in FIG. 16, where the MAC CE has a size of 5 octets and contains 32 $T_i$ fields corresponding to 32 different TCI State IDs (where i=0, 1, 2, . . . , 31). In this example, the list relating the number of TCI states to codepoints of the DCI Transmission Configuration Indication field is configured as $\{K_0=1, K_1=2, K_2=1, K_3=2, K_4=1, K_5=1, K_6=2, K_7=1\}$. In this example, TCI States with IDs i=2, 5, 7, 9, 11, 13, 18, 19, 23, 26, and 29 are activated. The mapping of activated TCI State IDs to the codepoint values of the DCI Transmission Configuration Indication field may then be given as follows:

TCI State ID i=2 corresponds to codepoint value 0;
TCI State IDs i=5 and 7 correspond to codepoint value 1;
TCI State ID i=9 corresponds to codepoint value 2;

TCI State IDs i=11 and 13 correspond to codepoint value 3;

TCI State ID i=18 corresponds to codepoint value 4;
TCI State ID i=19 corresponds to codepoint value 5;
TCI State IDs i=23 and 26 corresponds to codepoint value 6; and
TCI State ID i=29 corresponds to codepoint value 7.

In a variant of this embodiment, like the similar variant of the first embodiment, the reserved bit R in the first octet is used to select two first or two last TCI states to be further selected by the Antenna Ports field in the DCI as described above. An advantage of this arrangement is that, because RRC is relatively slow, a faster option to switch between two sets of TCI states is provided.

EMBODIMENT 3

In this embodiment, the number of TCI states to be mapped to a single codepoint in the DCI Transmission Configuration Indication field via MAC CE is contained within the MAC CE message.

A first example of this embodiment is shown in FIG. 17. In this first example, the bits $\{S_0, S_1\}$ provide the number of TCI states per codepoint in the DCI Transmission Configuration Indication field. The same number of TCI States (given by bits $\{S_0, S_1\}$) are mapped to each of the codepoints in the DCI Transmission Configuration Indication field. The two bits $\{S_0, S_1\}$ can be used to set the number of TCI States per codepoint to any one of the values among 1, 2, 3, or 4. Although two bits are shown in this example, the number of TCI states per codepoint can be provided by another integer number of bits.

A second example of Embodiment 3 is shown in FIG. 18. In this second example, bit in the MAC CE provides the number of TCI states mapped to codepoint j (where j=0, 1, 2, . . . , 7) in the DCI Transmission Configuration Indication field. For instance, if $S_j=0$, a single TCI state is mapped to codepoint j; and if $S_j=1$, two TCI states are mapped to codepoint j. Although a single bit is shown in this example, the number of TCI states per codepoint can be provided by another integer number of bits.

In a third example of this embodiment, there is only one $S_o$ bit and the reserved field R along with the $S_o$ bit is used to provide the number of TCI states per codepoint in the DCI Transmission Configuration Indication field.

EMBODIMENT 4

In this embodiment, one or more bits may be included in the MAC CE to indicate the $m^{th}$ TCI state associated with the codepoints in the DCI Transmission Configuration Indication field. For example, if the one or more bits indicate m=1, then the WD 22 receives the $1^{st}$ activated TCI states associated with the codepoints. For the $1^{st}$ activated TCI states, the WD 22 can be indicated up to 8 TCI State IDs where each TCI State ID corresponds to one codepoint. Similarly, if the one or more bits indicate m=2, then the WD 22 receives the $2^{nd}$ activated TCI states associated with the codepoints. For the $2^{nd}$ activated TCI states, the WD 22 can be indicated up to another 8 TCI State IDs where each TCI State ID corresponds to one codepoint.

To avoid associating the same TCI state for the $1^{st}$ TCI state and a $2^{nd}$ TCI state of a codepoint in the DCI Transmission Configuration Indication field, a restriction in the MAC CE TCI State indication can be defined such that the $1^{st}$ and the $2^{nd}$ TCI States associated with a codepoint have different TCI State IDs.

EMBODIMENT 5

In this embodiment, a binary bit is included in the MAC CE to differentiate between the TCI States Activation/Deactivation for WD-specific PDSCH as defined in NR Rel-15 where a single TCI State is mapped to one codepoint of the DCI Transmission Configuration Indication field, and any one or a combination of the schemes covered in Embodiments 1-4 is for mapping multiple TCI states to a single codepoint in the DCI Transmission Configuration Indication field.

For example, if the binary bit is set to zero, then the WD 22 interprets the MAC CE following NR Rel-15 behavior (that is, a single TCI State is mapped to one codepoint of the DCI Transmission Configuration Indication field). On the other hand, if the binary bit is set to one, then the WD 22 interprets the MAC CE following the new behavior where multiple states can be mapped to a single codepoint in the DCI Transmission Configuration Indication field. Note that by using a binary bit to differentiate between the two interpretations, this embodiment allows the MAC CE with the above two interpretations to be identified by a MAC packet data unit (PDU) subheader with the same logical channel identification (LCID) (i.e., LCID=53). In one particular variant of this embodiment, the binary bit used to differentiate between the two interpretations is the reserved bit R.

An example of this embodiment is shown in FIG. 19 and FIG. 20. In FIG. 19, the reserved bit R is set to 1, and the MAC CE is interpreted using a first interpretation where multiple (i.e., two) TCI states are mapped to a single codepoint in the DCI Transmission Configuration Indication field. In FIG. 20, the reserved bit R is set to 0, and the MAC CE is interpreted using a second interpretation where a single TCI state is mapped to a single codepoint in the DCI Transmission Configuration Indication field.

EMBODIMENT 6

In this embodiment, a separate MAC CE (i.e., different from the TCI States Activation/Deactivation for WD-specific PDSCH MAC CE defined in NR 3GPP Rel-15) is introduced for mapping multiple TCI states to a single codepoint in the DCI Transmission Configuration Indication field. This MAC CE message may include any one of the arrangements provided by Embodiments 1-4. This MAC CE is identified by a MAC PDU subheader with a different LCID from one use to identify TCI States Activation/Deactivation for WD-specific PDSCH MAC CE defined in NR 3GPP Rel-15.

EMBODIMENT 7

In this embodiment, RRC configures a list of N TCI triggering states. Each TCI triggering state can contain L>=1 TCI states. For example, a WD 22 can be configured with M TCI states and N TCI triggering states may be as defined below:

M TCI states: {TCI state #0, TCI state #1, . . . , TCI state # M−1}
N TCI triggering states:
  TCI triggering state #0: {TCI state #0, TCI state #2}
  TCI triggering state #1: {TCI state #1, TCI state #3}
  TCI triggering state #2: {TCI state #4}
  TCI triggering state #3: {TCI state #5}
  TCI triggering state #N−11: {TCI state #i, TCI state #j}

A MAC CE is used to activate up to 8 TCI triggering states out of the N triggering states:

{TCI triggering state #$n_k, n_k \in (0, 1, \ldots, N-1)$, k=0, 1, ..., 7}.

The codepoints of the DCI TCI bit field are mapped to the to the activated TCI triggering states as follows:

Codepoint k is mapped to activated TCI triggering state #n_k, k=0, 1, ..., 7.

A benefit of this embodiment may be that no major change in the MAC CE is needed and thus, the same MAC CE format can be used for legacy NR Release 3GPP 15 WDs 22 and new NR 3GPP Release 16 WDs 22. There may also be no RRC change needed for legacy WDs 22. For new 3GPP Release 16 WDs 22, a list of TCI triggering states may be added in the RRC configuration.

When a TCI triggering state containing more than one TCI states, e.g. {TCI state #i, TCI state #j}, as is triggered by a DCI, then the mapping between the TCI states and the CDM groups can be based at least in part on the order of the TCI states contained in the TCI triggering state, i.e., TCI state #i is mapped to CDM group $\lambda=0$ and TCI state #j to CDM group $\lambda=0$, i.e., CDM group $\lambda=0$: TCI state #i; and/or CDM group $\lambda=1$: TCI state #j.

Alternatively, the mapping between the TCI states in the TCI triggering state and the CDM groups can be based at least in part on the ID values of the TCI states. In the above example, if i<j, the same mapping as above would apply. Otherwise, if i>j, then the following mapping may be used:

CDM group $\lambda=0$: TCI state #j; and/or

CDM group $\lambda=1$: TCI state #i.

According to one aspect, a method in a network node 16 is provided. The method includes mapping, via the mapping unit 32, a single codepoint in a downlink message, e.g., DCI Transmission Configuration Indication, TCI, field to a multiple number of transmission states, e.g., TCI states represented by multiple fields set to a value of '1' in a medium access control, MAC, control element, CE, message.

According to this aspect, in some embodiments, the multiple number K of TCI states is configured to the wireless device via higher layer signaling such as radio resource control, RRC, signaling. In some embodiments, the same number K of TCI states are mapped to each codepoint in the DCI Transmission Configuration Indication field. In some embodiments, TCI states represented by K consecutive fields in the MAC CE set to a value of 1 are assigned to one codepoint in the DCI Transmission Configuration Indication field. In some embodiments, TCI states represented by K non-consecutive fields in the MAC CE set to a value of 1 are assigned to one codepoint in the DCI Transmission Configuration Indication field. In some embodiments, the dynamic choice of one or more among the K TCI states is based at least in part on the information indicated in the Antenna Ports field in DCI. In some embodiments, the number of TCI states chosen among the K TCI states depend on the number of code division multiplex, CDM, groups to which the DMRS ports indicated in the Antenna Ports field belong.

In some embodiments, a list {$K_0, K_1, \ldots, K_N$} is configured to the wireless device via higher layer signaling such as RRC where the configured number of TCI states per codepoint j in the DCI Transmission configuration Indication field is given by $K_j$ (where j=0, 1, 2, ..., N). In some embodiments, a different number $K_j$ of TCI states are mapped to each codepoint in the DCI Transmission Configuration Indication field. In some embodiments, TCI states represented by $K_j$ consecutive fields in the MAC CE set to a value of 1 are assigned to codepoint j in the DCI Transmission Configuration Indication field. In some embodiments, TCI states represented by $K_j$ non-consecutive fields in the MAC CE set to a value of 1 are assigned to codepoint j in the DCI Transmission Configuration Indication field. In some embodiments, the dynamic choice of one or more among the $K_j$ TCI States is based at least in part on the information indicated in the Antenna Ports field in DCI. In some embodiments, the number of TCI States chosen among the $K_j$ TCI states depend on the number of CDM groups to which the demodulation reference signal, DMRS, ports indicated in the Antenna Ports field belong.

In some embodiments, the multiple number K of TCI states is signaled to the wireless device within the MAC CE message. In some embodiments, the same number K of TCI states are mapped to each codepoint in the DCI Transmission Configuration Indication field. In some embodiments, TCI states represented by K consecutive fields in the MAC CE set to a value of 1 are assigned to one codepoint in the DCI Transmission Configuration Indication field. In some embodiments, TCI states represented by K non-consecutive fields in the MAC CE set to a value of 1 are assigned to one codepoint in the DCI Transmission Configuration Indication field. In some embodiments, the dynamic choice of one or more among the K TCI States is based at least in part on the information indicated in the Antenna Ports field in DCI. In some embodiments, the number of TCI States chosen among the K TCI states depends on the number of CDM groups to which the DMRS ports indicated in the Antenna Ports field belong. In some embodiments, the number $K_j$ of TCI states mapped to codepoint j in the DCI Transmission Configuration Indication field is signaled to the wireless device within the MAC CE message (where j=0, 1, 2, ..., N). In some embodiments, a different number $K_j$ of TCI states are mapped to each codepoint in the DCI Transmission Configuration Indication field. In some embodiments, TCI states represented by $K_j$ consecutive fields in the MAC CE set to a value of 1 are assigned to codepoint j in the DCI Transmission Configuration Indication field. In some embodiments, TCI states represented by $K_j$ non-consecutive fields in the MAC CE set to a value of 1 are assigned to codepoint j in the DCI Transmission Configuration Indication field. In some embodiments, the dynamic choice of one or more among the $K_j$ TCI States is based at least in part on the information indicated in the Antenna Ports field in DCI. In some embodiments, the number of TCI States chosen among the $K_j$ TCI states depends on the number of CDM groups to which the DMRS ports indicated in the Antenna Ports field belong to. In some embodiments, one or more bits in the MAC CE indicate the mth TCI state associated with the codepoints in the DCI Transmission Configuration Indication field. In some embodiments, one or binary bits included in the MAC CE differentiate between mapping a single TCI state to a codepoint in the DCI Transmission Configuration Indication field and mapping multiple TCI states to a codepoint in the DCI Transmission Configuration Indication field.

According to one aspect, a method in a wireless device is provided. The method includes receiving by signaling from the network node, a mapping of a single codepoint in a downlink message, e.g., downlink control information, DCI, Transmission Configuration Indication, TCI, field to a multiple number K of transmission states, e.g., TCI states represented by multiple fields set to a value of '1' in a medium access control, MAC, control element, CE, message. The method also includes selecting, via the TCI state selector unit 34, a TCI state based on an indication of DMRS ports in an Antenna Ports field in the DCI.

In addition, some embodiments of the present disclosure may include one or more of the following:

Embodiment A1. A network node that may communicate with a wireless device (WD), the network node comprising a radio interface and/or comprising processing circuitry to:

map a single codepoint in a downlink message, e.g. downlink control information (DCI) Transmission Configuration Indication, TCI, field to a multiple number K of transmission states, e.g., TCI states represented by multiple fields set to a value of '1' in a medium access control, MAC, control element, CE, message.

NOTE 1: In the following embodiments, the terms DCI TCI field is used in line with exemplary embodiments, however, other downlink messages may be suitable. Likewise, the term TCI states is used, however, other transmission states may be suitable.

NOTE 2: In the following embodiments, the value of the multiple fields of a MAC CE message is assumed to be set to 1; but the other values may be possible Embodiment A2. The network node of Embodiment A1, where the multiple number K of TCI states is configured to the wireless device via higher layer signaling such as radio resource control, RRC, signaling.

Embodiment A3. The network node of any of Embodiments A1 and A2, wherein the same number K of TCI states are mapped to each codepoint in the DCI Transmission Configuration Indication field.

Embodiment A4. The network node of any of Embodiments A1-A3, wherein TCI states represented by K consecutive fields in the MAC CE set to a value of 1 are assigned to one codepoint in the DCI Transmission Configuration Indication field.

Embodiment A5. The network node of any of Embodiments A1-A3, wherein TCI states represented by K non-consecutive fields in the MAC CE set to a value of 1 are assigned to one codepoint in the DCI Transmission Configuration Indication field.

Embodiment A6. The network node of any of Embodiments A1-A5, wherein a dynamic choice of one or more among the K TCI states is based at least in part on information indicated in the Antenna Ports field in DCI.

Embodiment A7. The network node of Embodiment A6, wherein the number of TCI states chosen among the K TCI states depend on the number of code division multiplex, CDM, groups to which DMRS ports indicated in the Antenna Ports field belong.

Embodiment A8. The network node of Embodiment A1, wherein a list $\{K_0, K_1, K_N\}$ is configured to the wireless device via higher layer signaling such as RRC where the configured number of TCI states per codepoint j in the DCI Transmission configuration Indication field is given by $K_j$ (where j=0, 1, 2, . . . , N). Embodiment A9. The network node of any of Embodiments A1 and A8, wherein a different number $K_j$ of TCI states are mapped to each codepoint in the DCI Transmission Configuration Indication field.

Embodiment A10. The network node of any of Embodiments A1, A8 and A9, wherein TCI states represented by $K_j$ consecutive fields in the MAC CE set to a value of 1 are assigned to codepoint j in the DCI Transmission Configuration Indication field.

Embodiment A11. The network node of any of Embodiments A1, A8 and A9, wherein TCI states represented by $K_j$ non-consecutive fields in the MAC CE set to a value of 1 are assigned to codepoint j in the DCI Transmission Configuration Indication field.

Embodiment A12. The network node of any of Embodiments A1 and A8-A11, wherein a dynamic choice of one or more among the $K_j$ TCI States is based at least in part on information indicated in the Antenna Ports field in DCI.

Embodiment A13. The network node of Embodiment A12, wherein the number of TCI States chosen among the $K_j$ TCI states depend on the number of CDM groups to which demodulation reference signal, DMRS, ports indicated in the Antenna Ports field belong.

Embodiment A14. The network node of Embodiment A1, wherein the multiple number K of TCI states is signaled to the wireless device within the MAC CE message.

Embodiment A15. The network node of any of Embodiments A1 and A14, wherein the same number K of TCI states are mapped to each codepoint in the DCI Transmission Configuration Indication field.

Embodiment A16. The network node of any of Embodiments A1 and A14-15, wherein TCI states represented by K consecutive fields in the MAC CE set to a value of 1 are assigned to one codepoint in the DCI Transmission Configuration Indication field.

Embodiment A17. The network node of any of Embodiments A1, A14 and A15, wherein TCI states represented by K non-consecutive fields in the MAC CE set to a value of 1 are assigned to one codepoint in the DCI Transmission Configuration Indication field.

Embodiment A18. The network node of any of Embodiment A1 and A14-A17, wherein a dynamic choice of one or more among the K TCI States is based at least in part on information indicated in the Antenna Ports field in DCI.

Embodiment A19. The network node of Embodiment A18, wherein the number of TCI States chosen among the K TCI states depends on the number of CDM groups to which DMRS ports indicated in the Antenna Ports field belong.

Embodiment A20. The network node of Embodiment A1, wherein the number $K_j$ of TCI states mapped to codepoint j in the DCI Transmission Configuration Indication field is signaled to the wireless device within the MAC CE message (where j=0, 1, 2, . . . , N).

Embodiment A21. The network node of any of Embodiments A1 and A20, wherein a different number $K_j$ of TCI states are mapped to each codepoint in the DCI Transmission Configuration Indication field.

Embodiment A22. The network node of any of Embodiments A1, A20 and A21, wherein TCI states represented by $K_j$ consecutive fields in the MAC CE set to a value of 1 are assigned to codepoint j in the DCI Transmission Configuration Indication field.

Embodiment A23. The network node of any of Embodiments A1, A20 and A21, wherein TCI states represented by $K_j$ non-consecutive fields in the MAC CE set to a value of 1 are assigned to codepoint j in the DCI Transmission Configuration Indication field.

Embodiment A24. The network node of any of Embodiments A1 and A20-A23, wherein a dynamic choice of one or more among the $K_j$ TCI States is based at least in part on information indicated in the Antenna Ports field in DCI.

Embodiment A25. The network node of Embodiment A24, wherein the number of TCI States chosen among the $K_j$ TCI states depends on the number of CDM groups to which DMRS ports indicated in the Antenna Ports field belong to.

Embodiment A26. The network node of Embodiment A1, wherein one or more bits in the MAC CE indicate an mth TCI state associated with the codepoints in the DCI Transmission Configuration Indication field.

Embodiment A27. The network node of Embodiment A1, wherein one or binary bits included in the MAC CE differentiate between mapping a single TCI state to a codepoint in the DCI Transmission Configuration Indication field and mapping multiple TCI states to a codepoint in the DCI Transmission Configuration Indication field.

Embodiment B1. A method for a network node, the method comprising:

mapping a single codepoint in a downlink message, e.g., downlink control information, DCI, Transmission Configuration Indication, TCI, field to a multiple number K of transmission states, e.g., TCI states represented by multiple fields set to a value of '1' in a medium access control, MAC, control element, CE, message.

NOTE 3: In the following embodiments, the terms DCI TCI field is used in line with exemplary embodiments, however, other downlink messages may be suitable. Likewise, the term TCI states is used, however, other transmission states may be suitable.

NOTE 4: In the following embodiments, the value of the multiple fields of a MAC CE message is assumed to be set to 1; but the other values may be possible Embodiment B2. The method of Embodiment B1, where the multiple number K of TCI states is configured to the wireless device via higher layer signaling such as radio resource control, RRC, signaling.

Embodiment B3. The method of any of Embodiments B1 and B2, wherein the same number K of TCI states are mapped to each codepoint in the DCI Transmission Configuration Indication field.

Embodiment B4. The method of any of Embodiments B1-B3, wherein TCI states represented by K consecutive fields in the MAC CE set to a value of 1 are assigned to one codepoint in the DCI Transmission Configuration Indication field.

Embodiment B5. The method of any of Embodiments B1-B3, wherein TCI states represented by K non-consecutive fields in the MAC CE set to a value of 1 are assigned to one codepoint in the DCI Transmission Configuration Indication field.

Embodiment B6. The method of any of Embodiments B1-B5, wherein a dynamic choice of one or more among the K TCI states is based at least in part on information indicated in the Antenna Ports field in DCI.

Embodiment B7. The method of Embodiment B6, wherein the number of TCI states chosen among the K TCI states depend on the number of code division multiplex, CDM, groups to which DMRS ports indicated in the Antenna Ports field belong.

Embodiment B8. The method of Embodiment B1, wherein a list $\{K_0, K_1, \ldots, K_N\}$ is configured to the wireless device via higher layer signaling such as RRC where the configured number of TCI states per codepoint j in the DCI Transmission configuration Indication field is given by $K_j$ (where j=0, 1, 2, . . . , N).

Embodiment B9. The method of any of Embodiments B1 and B8, wherein a different number $K_j$ of TCI states are mapped to each codepoint in the DCI Transmission Configuration Indication field.

Embodiment B10. The method of any of Embodiments B1, B8 and B9, wherein TCI states represented by $K_j$ consecutive fields in the MAC CE set to a value of 1 are assigned to codepoint j in the DCI Transmission Configuration Indication field.

Embodiment B11. The method of any of Embodiments B1, B8 and B9, wherein TCI states represented by $K_j$ non-consecutive fields in the MAC CE set to a value of 1 are assigned to codepoint j in the DCI Transmission Configuration Indication field.

Embodiment B12. The method of any of Embodiments B1 and B8-B11, wherein dynamic choice of one or more among the $K_j$ TCI States is based at least in part on information indicated in the Antenna Ports field in DCI.

Embodiment B13. The method of Embodiment B12, wherein the number of TCI States chosen among the $K_j$ TCI states depend on the number of CDM groups to which demodulation reference signal, DMRS, ports indicated in the Antenna Ports field belong.

Embodiment B14. The method of Embodiment B1, wherein the multiple number K of TCI states is signaled to the wireless device within the MAC CE message.

Embodiment B15. The method of any of Embodiments B1 and B14, wherein the same number K of TCI states are mapped to each codepoint in the DCI Transmission Configuration Indication field.

Embodiment B16. The method of any of Embodiments B1 and B14-B15, wherein TCI states represented by K consecutive fields in the MAC CE set to a value of 1 are assigned to one codepoint in the DCI Transmission Configuration Indication field.

Embodiment B17. The method of any of Embodiments B1, B14 and B15, wherein TCI states represented by K non-consecutive fields in the MAC CE set to a value of 1 are assigned to one codepoint in the DCI Transmission Configuration Indication field.

Embodiment B18. The method of any of Embodiment B1 and B14-B17, wherein the dynamic choice of one or more among the K TCI States is based at least in part on the information indicated in the Antenna Ports field in DCI.

Embodiment B19. The method of Embodiment B18, wherein the number of TCI States chosen among the K TCI states depends on the number of CDM groups to which DMRS ports indicated in the Antenna Ports field belong.

Embodiment B20. The method of Embodiment B1, wherein the number $K_j$ of TCI states mapped to codepoint j in the DCI Transmission Configuration Indication field is signaled to the wireless device within the MAC CE message (where j=0, 1, 2, . . . , N).

Embodiment B21. The method of any of Embodiments B1 and B20, wherein a different number $K_j$ of TCI states are mapped to each codepoint in the DCI Transmission Configuration Indication field.

Embodiment B22. The method of any of Embodiments B1, B20 and B21, wherein TCI states represented by $K_j$ consecutive fields in the MAC CE set to a value of 1 are assigned to codepoint j in the DCI Transmission Configuration Indication field.

Embodiment B23. The method of any of Embodiments B1, B20 and B21, wherein TCI states represented by $K_j$ non-consecutive fields in the MAC CE set to a value of 1 are assigned to codepoint j in the DCI Transmission Configuration Indication field.

Embodiment B24. The method of any of Embodiments B1 and B20-B23, wherein a dynamic choice of one or more among the $K_j$ TCI States is based at least in part on information indicated in the Antenna Ports field in DCI.

Embodiment B25. The method of Embodiment B24, wherein the number of TCI States chosen among the $K_j$ TCI states depends on the number of CDM groups to which DMRS ports indicated in the Antenna Ports field belong to.

Embodiment B26. The method of Embodiment B1, wherein one or more bits in the MAC CE indicate an mth TCI state associated with the codepoints in the DCI Transmission Configuration Indication field.

Embodiment B27. The method of Embodiment B1, wherein one or binary bits included in the MAC CE differentiate between mapping a single TCI state to a codepoint in the DCI Transmission Configuration Indication field and mapping multiple TCI states to a codepoint in the DCI Transmission Configuration Indication field.

Embodiment C1. A wireless device that may communicate with a network node, the wireless device (WD) comprising a radio interface and/or comprising processing circuitry to:
  receive, e.g. from the network node, a mapping of a single codepoint in a downlink message, e.g., downlink control information, DCI, Transmission Configuration Indication, TCI, field to a multiple number K of transmission states, e.g., TCI states represented by multiple fields set to a value of '1' in a medium access control, MAC, control element, CE, message; and/or
  select a TCI state based on an indication of DMRS ports in an Antenna Ports field in the DCI,
  wherein, optionally, the receiving may further be characterized by any combination of features of Embodiments A2-A27.

Embodiment D1. A method in a wireless device, the method comprising:
  receiving from a network node, a mapping of a single codepoint in a downlink message, e.g., downlink control information, DCI, Transmission Configuration Indication, TCI, field to a multiple number K of transmission states, e.g., TCI states represented by multiple fields set to a value of '1' in a medium access control, MAC, control element, CE, message; and/or
  selecting a TCI state based on an indication of DMRS ports in an Antenna Ports field in the DCI,
  wherein, optionally, the receiving may further be characterized by any combination of features of Embodiments A2-A27.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:
  transmitting within a medium access control (MAC) control element (CE) message, to a wireless device (WD) an indication of a plurality $K_j$ of Transmission Configuration Indication(TCI) states that are mapped to a single codepoint, j, of a plurality of codepoints in a downlink control information(DCI) TCI field of a DCI, $K_j$ and j being integers; and
  transmitting within the MAC CE message, to the wireless device, the number $K_j$ of TCI states being mapped to the single codepoint j, for each single codepoint j in the plurality of codepoints, the number Kj of TCI states has a value from a plurality of possible values, the DCI including an antenna ports field, the antenna ports field including an indication of at least one demodulation reference signal (DMRS) port usable by the WD to select a TCI state.

2. The method of claim 1, wherein j is an integer in a set of integers $\{0, 1, 2, \ldots, N\}$ and there is a plurality of N+1 codepoints in the DCI TCI field.

3. The method of claim 1, wherein TCI states represented by non-consecutive fields in the MAC CE are assigned to the single codepoint j in the DCI TCI field.

4. The method of claim 1, wherein the MAC CE message is identified by a MAC packet data unit (PDU) subheader having a first logical channel identity (LCID), the first LCID being different from a second LCID, the second LCID being used to identify TCI state at least one of activation and deactivation for a WD-specific physical downlink shared channel (PDSCH) MAC CE as defined in Third Generation Partnership Project (3GPP) Release 15.

5. A network node configured to communicate with a wireless device, WD, the network node comprising processing circuitry, the processing circuitry configured to cause the network node to:
  transmit within a medium access control (MAC) control element (CE) message, to a wireless device (WD) an indication of a plurality $K_j$ of Transmission Configuration Indication, TCI, (TCI) states that are mapped to a single codepoint, j, of a plurality of codepoints in a downlink control information (DCI) TCI field of a DCI, $K_j$ and j being integers; and
  transmit within the MAC CE message, to the wireless device, the number $K_j$ of TCI states being mapped to the single codepoint j, for each single codepoint j in the plurality of codepoints, the number Kj of TCI states has a value from a plurality of possible values, the DCI including an antenna ports field, the antenna ports field including an indication of at least one demodulation reference signal (DMRS) port usable by the WD to select a TCI state.

6. The network node of claim 5, wherein j is an integer in a set of integers $\{0, 1, 2, \ldots, N\}$ and there is a plurality of N+1 codepoints in the DCI TCI field.

7. The network node of claim 5, wherein TCI states represented by non-consecutive fields in the MAC CE are assigned to the single codepoint j in the DCI TCI field.

8. The network node of claim 5, wherein the MAC CE message is identified by a MAC packet data unit (PDU) subheader having a first logical channel identity (LCID), the first LCID being different from a second LCID, the second LCID being used to identify TCI state at least one of activation and deactivation for a WD-specific physical downlink shared channel (PDSCH) MAC CE as defined in Third Generation Partnership Project (3GPP) Release 15.

9. A method implemented in a wireless device, (WD) the method comprising:
  receiving within a medium access control (MAC) control element (CE) message, from a network node, an indication of a plurality $K_j$ of Transmission Configuration Indication (TCI) states that are mapped to a single codepoint, j, of a plurality of codepoints in a downlink control information (DCI) TCI field of a DCI, $K_j$ and j being integers; and
  receiving within the MAC CE message, from the network node, the number $K_j$ of TCI states being mapped to the single codepoint j and for each single codepoint j in the plurality of codepoints, the number Kj of TCI states has a value from a plurality of possible values; and
  selecting a TCI state based on an indication of at least one demodulation reference signal (DMRS) port in an antenna ports field in the DCI.

10. The method of claim 9, wherein j is an integer in a set of integers $\{0, 1, 2, \ldots, N\}$ and there is a plurality of N+1 codepoints in the DCI TCI field.

11. The method of claim 9, wherein TCI states represented by non-consecutive fields in the MAC CE are assigned to the single codepoint j in the DCI TCI field.

12. The method of claim 9, wherein the MAC CE message is identified by a MAC packet data unit (PDU) subheader having a first logical channel identity (LCID), the first LCID being different from a second LCID, the second LCID being used to identify TCI state at least one of activation and deactivation for a WD-specific physical downlink shared channel (PDSCH) MAC CE as defined in Third Generation Partnership Project (3GPP) Release 15.

13. A wireless device (WD) configured to communicate with a network node, the wireless device comprising processing circuitry, the processing circuitry configure to cause the wireless device to:
  receive within a medium access control (MAC) control element (CE) message, from the network node, an indication of a plurality $K_j$ of Transmission Configuration Indication (TCI) states that are mapped to a single codepoint, j, of a plurality of codepoints in a downlink control information (DCI) TCI field of a DCI, $K_j$ and j being integers;
  receive within the MAC CE message, from the network node, the number $K_j$ of TCI states being mapped to the single codepoint j and for each single codepoint j in the plurality of codepoints, the number Kj of TCI states has a value from a plurality of possible values; and
  select a TCI state based on an indication of at least one demodulation reference signal (DMRS) port in an antenna ports field in the DCI.

14. The wireless device of claim 13, wherein j is an integer in a set of integers $\{0, 1, 2, \ldots, N\}$ and there is a plurality of N+1 codepoints in the DCI TCI field.

15. The wireless device of claim 13, wherein TCI states represented by non-consecutive fields in the MAC CE are assigned to the single codepoint j in the DCI TCI field.

16. The wireless device of claim 13, wherein the MAC CE message is identified by a MAC packet data unit (PDU) subheader having a first logical channel identity, LCID (LCID), the first LCID being different from a second LCID, the second LCID being used to identify TCI state at least one of activation and deactivation for a WD-specific physical downlink shared channel (PDSCH) MAC CE as defined in Third Generation Partnership Project (3GPP) Release 15.

17. The method of claim 2, wherein TCI states represented by non-consecutive fields in the MAC CE are assigned to the single codepoint j in the DCI TCI field.

18. The method of claim 2, wherein the MAC CE message is identified by a MAC packet data unit(PDU) subheader having a first logical channel identity (LCID), the first LCID being different from a second LCID, the second LCID being used to identify TCI state at least one of activation and deactivation for a WD-specific physical downlink shared channel (PDSCH) MAC CE as defined in Third Generation Partnership Project (3GPP) Release 15.

* * * * *